US011133527B2

(12) United States Patent
Safanama et al.

(10) Patent No.: US 11,133,527 B2
(45) Date of Patent: Sep. 28, 2021

(54) SOLID ELECTROLYTE

(71) Applicant: National University of Singapore, Singapore (SG)

(72) Inventors: Dorsasadat Safanama, Singapore (SG); Stefan Nikolaus Adams, Singapore (SG)

(73) Assignee: National University of Singapore, Singapore (SG)

( * ) Notice: Subject to any disclaimer, the term of this patent is extended or adjusted under 35 U.S.C. 154(b) by 137 days.

(21) Appl. No.: 16/332,214

(22) PCT Filed: Sep. 13, 2017

(86) PCT No.: PCT/SG2017/050459
§ 371 (c)(1),
(2) Date: Mar. 11, 2019

(87) PCT Pub. No.: WO2018/052371
PCT Pub. Date: Mar. 22, 2018

(65) Prior Publication Data
US 2019/0221879 A1     Jul. 18, 2019

Related U.S. Application Data

(60) Provisional application No. 62/393,870, filed on Sep. 13, 2016.

(51) Int. Cl.
*H01M 10/056* (2010.01)
*H01M 8/18* (2006.01)
(Continued)

(52) U.S. Cl.
CPC ............ *H01M 10/056* (2013.01); *H01B 1/06* (2013.01); *H01B 1/20* (2013.01); *H01M 4/382* (2013.01);
(Continued)

(58) Field of Classification Search
CPC ....................... H01M 10/0565; H01M 10/054
See application file for complete search history.

(56) References Cited

U.S. PATENT DOCUMENTS

2002/0034688 A1    3/2002  Chu et al.
2007/0172739 A1*   7/2007  Visco ...................... H01M 4/32
                                                                429/322
(Continued)

FOREIGN PATENT DOCUMENTS

CN    103367799 A    10/2013
CN    103367799 A    10/2013
(Continued)

OTHER PUBLICATIONS

Machine translation of JP H10-50141 (no date).*
(Continued)

*Primary Examiner* — Amanda C. Walke
(74) *Attorney, Agent, or Firm* — Thomas Horstemeyer, LLP

(57) ABSTRACT

The present invention relates to a solid electrolyte comprising a first polymer which is a polyvinyl acetal or polyvinyl acetate, or a copolymer having vinyl acetal and/or vinyl acetate units, doped with a sodium or lithium salt. The solid electrolyte may be used as an ionically conductive membrane in a battery such a Li-air battery.

18 Claims, 7 Drawing Sheets

(51) Int. Cl.
| | |
|---|---|
| *H01M 10/054* | (2010.01) |
| *H01M 12/08* | (2006.01) |
| *H01B 1/20* | (2006.01) |
| *H01B 1/06* | (2006.01) |
| *H01M 4/58* | (2010.01) |
| *H01M 10/052* | (2010.01) |
| *H01M 4/38* | (2006.01) |
| *H01M 50/446* | (2021.01) |
| *H01M 10/0525* | (2010.01) |
| *H01M 10/0565* | (2010.01) |
| *H01M 12/02* | (2006.01) |
| H01M 8/1048 | (2016.01) |

(52) U.S. Cl.
CPC ......... *H01M 4/5815* (2013.01); *H01M 8/188* (2013.01); *H01M 10/052* (2013.01); *H01M 10/054* (2013.01); *H01M 10/0525* (2013.01); *H01M 10/0565* (2013.01); *H01M 12/02* (2013.01); *H01M 12/08* (2013.01); *H01M 50/446* (2021.01); *H01M 8/1048* (2013.01); *H01M 2300/0082* (2013.01); *H01M 2300/0091* (2013.01); *Y02E 60/10* (2013.01)

(56) References Cited

U.S. PATENT DOCUMENTS

| | | | |
|---|---|---|---|
| 2008/0220334 | A1* | 9/2008 | Inda .................... C03C 4/18 429/322 |
| 2010/0216031 | A1 | 8/2010 | MaCHida |
| 2012/0094188 | A1 | 4/2012 | Visco et al. |
| 2013/0059177 | A1 | 3/2013 | De Jonghe et al. |
| 2014/0004447 | A1 | 1/2014 | Visco et al. |
| 2016/0211498 | A1 | 7/2016 | Kim et al. |
| 2016/0240838 | A1* | 8/2016 | Hayashi .............. H01M 4/0407 |
| 2017/0256817 | A1* | 9/2017 | Kadoma .............. C01B 32/198 |
| 2019/0173130 | A1* | 6/2019 | Schuhmacher ........... C03C 4/18 |
| 2019/0288332 | A1* | 9/2019 | Hotta ................. H01M 10/0565 |
| 2020/0017649 | A1* | 1/2020 | Agrawal ........... B32B 17/10302 |
| 2020/0335815 | A1* | 10/2020 | Hayashi ................... H01B 1/10 |
| 2020/0373615 | A1* | 11/2020 | Shin ................. H01M 10/0565 |

FOREIGN PATENT DOCUMENTS

| | | |
|---|---|---|
| CN | 103647107 A | 3/2014 |
| CN | 103647107 A | 3/2014 |
| JP | H10-10050141 A | 2/1998 |
| JP | 2014-175203 A | 9/2014 |
| WO | 2004006360 | 1/2004 |
| WO | 2010005686 | 1/2010 |
| WO | 2013028574 | 2/2013 |

OTHER PUBLICATIONS

Machine translation of JP 2014-175203 (no date).*
Balaish, Moran; et al. "A critical review on lithium-air battery electrolytes." Physical Chemistry Chemical Physics 16.7 (2014): 2801-2822.
Lu, Yi-Chun, et al. "Platinum-gold nanoparticles: a highly active bifunctional electrocatalyst for rechargeable lithium-air batteries." Journal of the American Chemical Society 132.35 (2010): 12170-12171.
Cheng, H.; et al. "Selection of oxygen reduction catalysts for rechargeable lithium-air batteries—Metal or oxide?." Applied Catalysis B: Environmental 108 (2011): 140-151.
Manthiram, Arumugam; et al. "Hybrid and Aqueous Lithium-Air Batteries." Advanced Energy Materials 5.4 (2015): 1401302.
Knauth, Philippe. "Inorganic solid Li ion conductors: An overview." Solid State Ionics 180.14-16 (2009): 911-916.
Li, Yutao, et al. "Optimizing Li+ conductivity in a garnet framework." Journal of Materials Chemistry 22.30 (2012):. 15357-15361.

Bruce, P. G.; et al. "Ionic conductivity of LISICON solid solutions, $Li_{2+2x}Zn_{1-x}GeO_4$." Journal of Solid State Chemistry 44.3 (1982): 354-365.
Sebastian, Litty; et al. "Probing the mobility of lithium in LISICON: Li+/H+ exchange studies in $Li_2 ZnGeO_4$ and $Li_{2+2x} Zn_{1-x} GeO_4$." Journal of Materials Chemistry 13.6 (2003): 1400-1405.
Nyman, May, et al. "Alternative approach to increasing Li mobility in Li—La—Nb/Ta garnet electrolytes." Chemistry of Materials 22.19 (2010): 5401-5410.
Ishiguro, K., et al. "Ta-doped $Li_7La_3Zr_2O_{12}$ for water-stable lithium electrode of lithium-air batteries." Journal of the Electrochemical Society 161.5 (2014): A668.
Ishiguro, K., et al. "Stability of Nb-doped cubic $Li_7La_3Zr_2O_{12}$ with lithium metal." Journal of The Electrochemical Society 160.10 (2013): A1690-A1693.
Sudo, R., et al. "Interface behavior between garnet-type lithium-conducting solid electrolyte and lithium metal." Solid State Ionics 262 (2014): 151-154.
Stramare, S.; et al. "Lithium lanthanum titanates: a review." Chemistry of materials 15.21 (2003): 3974-3990.
Geng, Hongxia, et al. "Effect of sintering temperature on microstructure and transport properties of $Li_{3x}La_{2/3-x}TiO_3$ with different lithium contents." Electrochimica Acta 56.9 (2011): 3406-3414.
Wolfenstine, J. "Stability predictions of solid Li-ion conducting membranes in aqueous solutions." Journal of materials science 45.14 (2010): 3954-3956.
Fu, Jie. "Superionic conductivity of glass-ceramics in the system $Li_2O—Al_2O_3-TiO_2-P_2O_5$." Solid State Ionics 96.3-4 (1997): 195-200.
Thokchom, Joykumar S; et al. "Ionically conducting composite membranes from the $Li_2O—Al_2O_3—TiO_2—P_2O_5$ glass-ceramic." Journal of the American Ceramic Society 902 (2007): 462-466.
Mariappan, Chinnasamy R., et al. "Correlation between microstructural properties and ionic conductivity of $Li_1.5Al_0.5Ge_{1.5}(PO_4)_3$ ceramics." Journal of Power Sources 196.15 (2011): 6456-6464.
Fu, Jie. "Fast Li+ ion conducting glass-ceramics in the system $Li_2O—Al_2O_3—GeO_2-P_2O_5$." Solid State Ionics 104.3-4 (1997): 191-194.
Kumar, B., D; et al. "Space-Charge-Mediated Superionic Transport in Lithium Ion Conducting Glass-Ceramics." Journal of the Electrochemical Society 156.7 (2009): A506-A513.
Xu, Xiaoxiong, et al. "Lithium ion-conducting glass-ceramics of $Li_{1.5}Al_{0.5}Ge_{1.5}(PO_4)_3 -xLi_2O$ (x=0.0-0.20) with good electrical and electrochemical properties." Journal of the American Ceramic Society 90.9 (2007): 2802-2806.
Zhang, Tao, et al. "Water-stable lithium anode with the three-layer construction for aqueous lithium-air secondary batteries." Electrochemical and solid-state letters 12.7 (2009): A132-A135.
Shimonishi, Yuta, et al. "A study on lithium/air secondary batteries—Stability of the NASICON-type lithium ion conducting solid electrolyte in alkaline aqueous solutions." Journal of Power Sources 196.11 (2011): 5128-5132.
Imanishi, Nobuyuki, et al. "Lithium anode for lithium-air secondary batteries." Journal of Power Sources 185.2 (2008): 1392-1397.
Liu, Siyang, et al. "Delineating the roles of $Co_3O_4$ and N-doped carbon nanoweb (CNW) in bifunctional $Co_3O_4$/CNW catalysts for oxygen reduction and oxygen evolution reactions." Journal of Materials Chemistry A 3.21 (2015): 11615-11623.
Li, Longjun; et al. "A dual-electrolyte rechargeable Li-air battery with phosphate buffer catholyte." Electrochemistry Communications 14.1 (2012): 78-81.
Li, Longjun, et al."Polyprotic acid catholyte for high capacity dual-electrolyte Li-air batteries." Physical Chemistry Chemical Physics 14.37 (2012): 12737-12740.
Li, Longjun; et al. "Decoupled bifunctional air electrodes for high-performance hybrid lithium-air batteries." Nano Energy 9 (2014): 94-100.
Li, Longjun; et al. "Dual-electrolyte lithium-air batteries: influence of catalyst, temperature, and solid-electrolyte conductivity on the efficiency and power density." Journal of Materials Chemistry A 1.16 (2013): 5121-5127.

(56) References Cited

OTHER PUBLICATIONS

Li, Longjun; et al. "Imidazole-buffered acidic catholytes for hybrid Li-air batteries with high practical energy density." Electrochemistry communications 47 (2014): 67-70.
Li, Longjun, et al. "Advanced hybrid Li-air batteries with high-performance mesoporous nanocatalysts." Energy & Environmental Science 7.8 (2014): 2630-2636.
Stevens, Philippe, et al. "Very high specific area lithium-air battery." ECS Transactions 50.25 (2013): 1
Zhang, Tao, et al. "A novel high energy density rechargeable lithium/air battery." Chemical Communications 46.10 (2010): 1661-1663.
Wang, Yonggang,; et al. "A lithium-air battery with a potential to continuously reduce O2 from air for delivering energy." Journal of Power Sources 195.1 (2010): 358-361.
Zhang, Ming, et al. "Water-stable lithium anode with Li1.4Al0.4Ge1.6(PO4)3-TiO2 sheet prepared by tape casting method for lithium-air batteries." Journal of power sources 235 (2013): 117-121.
Boulant, Anthony, et al. "Reaction mechanisms of Li 0.30 La 0.57 TiO 3 powder with ambient air: H+/Li+ exchange with water and Li 2 CO 3 formation." Dalton Transactions 39.16 (2010): 3968-3975.
Liu, Cai, et al. "Reversible ion exchange and structural stability of garnet-type Nb-doped Li7La3Zr2O12 in water for applications in lithium batteries." Journal of Power Sources 282 (2015): 286-293.
Truong, Lina; et al. "Soft-Chemistry of Garnet-Type Li5+ x Ba x La3-x Nb2O12 (x=0, 0.5, 1): Reversible H+? Li+ Ion-Exchange Reaction and Their X-ray, 7Li MAS NMR, IR, and AC Impedance Spectroscopy Characterization." Chemistry of Materials 23.17 (2011): 3970-3977.
Zhang, Tao, et al. "Stability of a water-stable lithium metal anode for a lithium-air battery with acetic acid-water solutions." Journal of the Electrochemical Society 157.2 (2010): A214-A218.
Li, Yunfeng; et al. "A hybrid Li-air battery with buckypaper air cathode and sulfuric acid electrolyte." Electrochimica acta 81 (2012):20-24.
Liu, Tao, et al. "Cycling Li—O2 batteries via LiOH formation and decomposition." Science 350.6260 (2015): 530-533.
Armand, Michel; et al. "Building better batteries." nature 451.7179 (2008): 652-657.
Weston, J. E.; et al. "Effects of inert fillers on the mechanical and electrochemical properties of lithium salt-poly (ethylene oxide) polymer electrolytes." Solid State Ionics 7.1 (1982): 75-79.
Abraham, K. M.; et al. "Inorganic-Organic Composite Solid Polymer Electrolytes." Journal of The Electrochemical Society 147.4 (2000): 1251-1256.
Zhang, Xiang-Wu, et al. "Characteristics of lithium-ion-conducting composite polymer-glass secondary cell electrolytes." Journal of power sources 112.1 (2002): 209-215.
Zhang, Peng, et al. "Tape-Gast water-stable NASICON-type high lithium ion conducting solid electrolyte films for aqueous lithium-air batteries." Journal of the Electrochemical Society 162.7 (2015): A1265-A1271.
Zhang, Ming, et al. "Preparation and electrochemical properties of Li1+ xAlxGe2-x (PO4) 3 synthesized by a sol-gel method." Journal of the Electrochemical Society 159.7 (2012): A1114-A1119.
Aono, Hiromichi; et al. "High Li+ conducting ceramics." Accounts of chemical research 27.9 (1994): 265-270.
Thokchom, Joykumar S.; et al. "Superionic conductivity in a lithium aluminum germanium phosphate glass-ceramic." Journal of the Electrochemical Society 155.12 (2008): A915.
Bruce, Peter G., et al. "Li—O 2 and Li—S batteries with high energy storage." Nature materials 11.1 (2012): 19-29.
Liu, Yijie, et al. "Fabrication and Performance of All-Solid-State Li-Air Battery with SWCNTs/LAGP Cathode." ACS applied materials & interfaces 7.31 (2015): 17307-17310.
Francisco, Brian E.; et al. "Lithium-ion trapping from local structural distortions in sodium super ionic conductor (NASICON) electrolytes." Chemistry of Materials 26.16 (2014): 4741-4749.
Lang, Britta; et al. "Lithium ion conduction in LiTi2 (PO4) 3 and related compounds based on the NASICON structure: a first-principles study." Chemistry of Materials 27.14 (2015): 5040-5048.
Arbi, Kamel, et al. "On the influence of the cation vacancy on lithium conductivity of Li1+ xRxTi2-x (PO4) 3 Nasicon type materials." Solid State Ionics 271 (2015): 28-33.
Arbi, Kamel, et al. "Structural Factors That Enhance Lithium Mobility in Fast-Ion Li1+ x Ti2-x Al x (PO4) 3 (0=x=0.4) Conductors Investigated by Neutron Diffraction in the Temperature Range 100-500 K." Inorganic chemistry 52.16 (2013): 9290-9296.
Maldonado-Manso, Pilar, et al. "High Lithium Ionic Conductivity in the Li1+ x Al x Ge y Ti2-x-y (PO4) 3 NASICON Series." Chemistry of materials 15.9 (2003): 1879-1885.
Aetukuri, Nagaphani B., et al. "Flexible ion-conducting composite membranes for lithium batteries." Advanced Energy Materials 5.14 (2015): 1500265.
Imanishi, Nobuyuki, and Osamu Yamamoto. "Rechargeable lithium-air batteries: characteristics and prospects." Materials today 17.1 (2014): 24-30.
Thangadurai, Venkataraman; et al. "Novel fast lithium ion conduction in garnet-type Li5La3M2O12 (M=Nb, Ta)." Journal of the American Ceramic Society 86.3 (2003): 437-440.
Wang, Hui, et al. "Interface properties between lithium metal and a composite polymer electrolyte of PEO18Li (CF3SO2) 2N-tetraethylene glycol dimethyl ether" Membranes 3.4 (2013): 298-310.
Safanama, Dorsasadat, and Stefan Adams. "High efficiency aqueous and hybrid lithium-air batteries enabled by Li1.5Al0.5Ge1.5(PO4)3 ceramic anode-protecting membranes." Journal of Power Sources 340 (2017): 294-301.
Safanama, Dorsasadat, et al. "Structural evolution of NASICON-type Li 1+ x Al x Ge 2-x (PO 4) 3 using in situ synchrotron X-ray powder diffraction." Journal of Materials Chemistry A 4.20 (2016): 7718-7726.
Safanama, Dorsasadat, et al. "Lithium conducting solid electrolyte Li1+ xAlxGe2-x (PO4) 3 membrane for aqueous lithium air battery" Solid State Ionics 262 (2014): 211-215.
Kumar, Binod, et al. "A solid-state, rechargeable, long cycle life lithium-air battery." Journal of The Electrochemical Society 157.1 (2009): A50.
Takahashi, K., et al. "A super high lithium ion conducting solid electrolyte of grain boundary modified Li1.4Ti1.6Al0.4(PO4)3." Journal of The Electrochemical Society 159.4 (2012): A342.
"Butvar Polyvinyl resins—Properties and Uses" Eastman Chemical Company Corporate Headquarters (2017) pp. 1-29.
Larson, A. C.; et al. "General structural analysis system (GSAS)." Los Alamos National Laboratory Report LAUR 86-748 (2004). pp. 1-108.
Larson, A. C.; et al. "General structural analysis system (GSAS)." Los Alamos National Laboratory Report LAUR 86-748 (2004). pp. 109-224.
Cofala, Janusz, et al. "Emissions of Air Pollutants for the World Energy Outlook 2011 Energy Scenarios." (2011). pp. 1-109.
Cofala, Janusz, et al. "Emissions of Air Pollutants for the World Energy Outlook 2011 Energy Scenarios." (2011). pp. 110-220.
Cofala, Janusz, et al. "Emissions of Air Pollutants for the World Energy Outlook 2011 Energy Scenarios." (2011). pp. 221-331.
Cofala, Janusz, et al. "Emissions of Air Pollutants for the World Energy Outlook 2011 Energy Scenarios." (2011). pp. 332-442.
Cofala, Janusz, et al. "Emissions of Air Pollutants for the World Energy Outlook 2011 Energy Scenarios." (2011). pp. 443-553.
Cofala, Janusz, et al. "Emissions of Air Pollutants for the World Energy Outlook 2011 Energy Scenarios." (2011). pp. 554-659.
Conductive Performances of Solid Polymer Electrolyte Films Based on PVB/LiCLO4 Plasticized by PEG200 and PEG600, Journal of Power Sources, 2008.
Preparation and electrochemical Characteristics of Plasticized Polymer Electrolytes Based Upon a P(VdF-co-HFP)/PV Ac blend, Elsevier Science LTD., 2001.
Structure. Thermal and Transport Properties of PVAc-LiClO4 Solid Polymer Electrolytes, Elsevier Ltd., 2006.
Flexible Light-Weight Lithium-Ion-Conducting Inorganic-Organic Composite Electrolyte Membrane, American Chemical Society, 2017.

(56) References Cited

OTHER PUBLICATIONS

Li et al., "Conductive performances of solid polymer electrolyte films based on PVB/LiClO4 plasticized by PEG200, PEG400, and PEG600", Power Sources, 187:2:305-311, Dec. 6, 2008; Abstract.
Choi et al., "Preparation and electrochemical characteristics of plasticized polymer electrolytes based upon a P(VdF-co-HFP)/PVAc blend", Electrochimica Acta, 46:10-11:1581-1586, Mar. 20, 2001; Abstract.
Baskaran et al., "Structure, thermal and transport properties of PVAc-LiClO4 solid polymer electrolytes", Journal of Physics and Chemistry of Solids, 68:3:407-412, Jan. 23, 2007; Abstract.
Safanama et al., "Flexible Light-Weight Lithium-Ion-Conducting Inorganic-Organic Composite Electrolyte Membrane", ACS Energy Letters, Apr. 20, 2017, 2:5:1130-1136; Abstract.
Written Opinion dated Dec. 13, 2017.
International Search Report dated Dec. 13, 2017.

\* cited by examiner (a)

(b)

(a)

(b)

(a)

(b)

(a)

(b)

(a)

(b)

(c)

SOLID ELECTROLYTE

CROSS-REFERENCE TO RELATED APPLICATION

This application is the 35 U.S.C. § 371 national stage application of PCT Application No. PCT/SG2017/050459, filed on Sep. 13, 2017, and entitled "SOLID ELECRO-LYTE," which claims priority to and the benefit of U.S. Provisional Patent Application No. 62/393,870, filed on Sep. 13, 2016. The entire content of both of these applications is incorporated by reference herein.

FIELD OF INVENTION

This invention concerns a solid electrolyte. The solid electrolyte is useful as an ionically conductive membrane divider in a battery. In particular this invention concerns a membrane divider suitable for use in a battery where the anode reacts with aqueous solutions such as a battery with a lithium anode, in particular, a lithium-air battery or a lithium-sulfide battery. However the solid electrolyte is useful in other applications including but not limited to sodium ion batteries and redox flow batteries

BACKGROUND

The listing or discussion of a prior-published document in this specification should not necessarily be taken as an acknowledgement that the document is part of the state of the art or is common general knowledge.

A wide range of advanced energy storage systems critically depend on the availability of a fast lithium-ion conducting membrane that protects the lithium or lithium alloy anode from reacting chemically with the catholyte or cathode material. Rechargeable Li-air batteries (LABs) are potentially an alternative to the currently available energy storage systems as they promise extremely high specific energy. Compared to conventional Li-air batteries relying on organic electrolytes, LABs utilizing aqueous catholytes are characterized by somewhat lower theoretical energy densities but exhibit a higher potential to reach the theoretical limits in practical devices in tandem with superior power performance, energy efficiency, and volumetric energy density due to the high solubility of the discharge products in the chosen aqueous catholytes.

Aqueous and hybrid LABs require fast ion-conducting anode protecting membranes that allow for fast $Li^+$ ion transport but safely prevent chemical reaction of the lithium metal anode with the catholyte. The main class of solid electrolytes that has been successfully employed as anode-protecting membranes in aqueous/hybrid LABs are NASI-CON-type fast Li-ion conducting ceramics ($Li_{1+x}Al_xGe_{2-x}(PO_4)_3$, referred to as "LAGP", and $Li_{1+x}Ti_{2-x}Al_x(PO_4)_3$, referred to as "LTAP"). However, the usefulness of NASI-CON-type ceramics is limited because, apart from the interfacial resistance at the electrolyte-electrode interface, preparing them in the appropriate dimensions for large-scale energy storage systems is difficult. Their brittleness also gives rise to a risk of cracking when mechanically stressed during assembly or operation, which in such systems constitutes a major safety hazard.

Organic polymer electrolytes are easy and cheap to prepare in large dimensions and in the desired degree of flexibility to improve the interfacial contact between the electrode and the electrolyte and to adapt to slight volume changes during cycling. Armand (2008) pioneered research on polymer-based ion-conducting materials in lithium batteries by studying the use of solid electrolytes consisting of polyethylene oxide (PEO) and weakly coordinating Li salts. The low density of polymer electrolytes is beneficial for the gravimetric energy density of the energy storage system, but so far, no solid polymer electrolyte has been found to have a suitable combination of high mechanical as well as chemical stability with fast $Li^+$ conductivity. Therefore an approach that has been taken is to combine ceramic and polymer electrolyte to prepare hybrid inorganic-organic membranes consisting of matrix and filler, where the overall properties of the system depend on the properties of both the filler and matrix in addition to the interaction between the two.

Abraham (2000) fabricated a ceramic-polymer membrane composed of $Li^+$ conductive LTAP ceramic and a PVdF-based gel electrolyte, which showed a high ionic conductivity and structural flexibility along with promising cyclability when employed in a Li/composite electrolyte/$LiCoO_2$ cell.

Zhang (2002) reported enhanced conductivity and interfacial stability under cycling while sandwiched between two lithium metal sheets by introducing LTAP into a PEO-based polymer electrolyte. However, while a PEO-based electrolyte might seem to be a potential electrolyte for lithium batteries, its poor stability in aqueous solutions makes it unsuitable for aqueous or hybrid LABs.

Safanama (2014) describes an inorganic-organic hybrid membrane containing LAGP and an ion-conducting PEO. Because PEO swells by taking up water from the catholyte, the PEO:PVdF:$LiBF_4$ membrane is quickly destroyed in practical applications using common catholytes such as LiOH or acidified LiCl solutions for aqueous Li-air batteries. Even under the mild phosphate buffer solution conditions described with reference to FIG. 6 of the Safanama (2014) paper, the cell could operate only for about 3 hours.

Aetukuri (2015) fabricated a composite membrane by embedding a monolayer of $Li_{1.6}Al_{0.5}Ti_{0.95}Ta_{0.5}(PO_4)_3$ (LTAP) particles into a non-conductive cyclo-olefin polymer (COP) matrix. Each particle in the monolayer extended through the matrix to make contact with both the catholyte and anolyte, with the matrix merely serving to hold the LTAP particles in this disposition. The membrane was used as an anode-protecting membrane in an organic Li-air cell where lithium iodide (LiI) was added as the redox mediator in the cathode side. Fabrication of a membrane with a monolayer LTAP particles extending through either side of a support matrix is likely to be difficult on an industrial scale.

Zhang (2015) prepared a composite film of $Li_{1.4}Al_{0.4}Ge_{0.2}Ti_{1.4}(PO_4)_3$ and an epoxy resin. The composite film was subjected to heat treatment at temperatures around 900° C., decomposing the epoxy resin. The resultant ceramic membrane was used as an anode-protecting membrane in aqueous LABs. An ionic conductivity of $5.3\times10^{-4}$ S $cm^{-1}$ and stability in contact with saturated LiCl aqueous solution were reported. However the LAB exhibited irregular charge and discharge curves, and the somewhat high overpotential and the short lifetime of the cell were not discussed.

Thus there remains a need for solid electrolyte materials which are stable when in contact with aqueous electrolytes but retain conductivity and flexibility.

SUMMARY OF INVENTION

Aspects and embodiments of the present invention are presented in the following clauses:

1. A solid electrolyte comprising a first polymer selected from one or more of the group consisting of a polyvinyl acetal, polyvinyl acetate, and a copolymer comprising vinyl acetal and/or vinyl acetate units; and a dopant comprising a lithium salt or a sodium salt.

2. A solid electrolyte as set forth in clause 1 wherein the polyvinyl acetal comprises units with the formula (I):

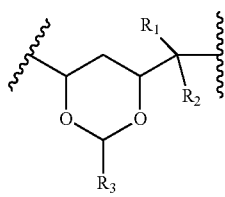

wherein $R_1$ and $R_2$ are independently selected from hydrogen, alkyl or alkyl substituted with hydroxyl, thiol, amino, halo, nitro, alkoxy, thioalkyl, alkylamino, dialkylamino, carboxy, alkoxycarbonyl, carbamoyl, thiocarbamoyl, alkylcarbamoyl, alkylthiocarbamoyl, dialkylcarbamoyl or dialkylthiocarbamoyl; and
$R_3$ is selected from hydrogen, alkyl or alkyl substituted with hydroxyl, thiol, amino, halo, nitro, alkoxy, thioalkyl, alkylamino, dialkylamino, carboxy, alkoxycarbonyl, carbamoyl, thiocarbamoyl, alkylcarbamoyl, alkylthiocarbamoyl, dialkylcarbamoyl or dialkylthiocarbamoyl.

3. A solid electrolyte as set forth in clause 2 wherein $R_1$ and $R_2$ are independently selected from hydrogen and alkyl.

4. A solid electrolyte as set forth in clause 3 wherein $R_1$ and $R_2$ are each hydrogen.

5. A solid electrolyte as set forth in any one of clauses 2 to 4 wherein $R_3$ is selected from hydrogen and alkyl.

6. A solid electrolyte as set forth in clause 5 wherein $R_3$ is alkyl.

7. A solid electrolyte as set forth in clause 6 wherein $R_3$ is methyl.

8. A solid electrolyte as set forth in clause 6 wherein $R_3$ is propyl.

9. A solid electrolyte as set forth in clause 8 wherein $R_3$ is n-propyl.

10. A solid electrolyte as set forth in clause 5 wherein $R_3$ is hydrogen.

11. A solid electrolyte as set forth in any one of clauses 1 to 10 wherein the first polymer is a copolymer comprising vinyl acetal units and units selected from one or more of the group consisting of vinyl acetate units, vinyl alcohol units, (meth)acrylic acid units, and methyl (meth)acrylate units.

12. A solid electrolyte as set forth in clause 11 wherein the first copolymer is a copolymer consisting of vinyl acetal units, vinyl acetate units and vinyl alcohol units.

13. A solid electrolyte as set forth in clause 12 wherein the copolymer has from 78 to 84% vinyl acetate units, from 15% to 25%, vinyl alcohol units and from 1 to 2% vinyl acetate units.

14. A solid electrolyte as set forth in clause 12 wherein the copolymer has from 76 to 81% vinyl acetate units, from 18% to 22%, vinyl alcohol units and from 1 to 2% vinyl acetate units.

15. A solid electrolyte as set forth in clause 12 wherein the copolymer has from 78 to 79% vinyl acetate units, about 20% vinyl alcohol units and from 1 to 2% vinyl acetate units.

16. A solid electrolyte as set forth in clause 1 wherein the polyvinyl acetal is polyvinyl butyral.

17. A solid electrolyte as set forth in clause 1 wherein the polyvinyl acetal is polyvinyl acetal itself.

18. A solid electrolyte as set forth in clause 1 wherein the polyvinyl acetal is polyvinyl formal.

19. A solid electrolyte as set forth in any one of clauses 1 to 18 wherein the solid electrolyte further comprises a second polymer selected from one or more of the group consisting of polyvinylidene difluoride (PVdF), polyvinyl alcohol, a polyolefin-based resin, poly(propylene carbonate) a polyester-based resin, tetrafluoroethylene, a vinylidene difluoride-hexafluoropropylene copolymer, a vinylidene difluoride-perfluorovinylether copolymer, a vinylidene difluoride-tetrafluoroethylene copolymer, a vinylidene difluoride-trifluoroethylene copolymer, a vinylidene difluoride-fluoroethylene copolymer, a vinylidene difluoride-hexafluoroacetone copolymer, a vinylidene difluoride-ethylene copolymer, a vinylidene difluoride-propylene copolymer, a vinylidene difluoride-trifluoropropylene copolymer, a vinylidene difluoride-tetrafluoroethylene-hexafluoropropylene copolymer and a vinylidene difluoride-ethylene-tetrafluoroethylene copolymer.

20. A solid electrolyte as set forth in clause 19 wherein the second polymer is selected from one or more of the group consisting of polyvinylidene difluoride (PVdF), polyvinyl alcohol, a polyolefin-based resin, poly(propylene carbonate), and tetrafluoroethylene.

21. A solid electrolyte as set forth in clause 20 wherein the second polymer is polyvinylidene fluoride.

22. A solid electrolyte as set forth in any one of clauses 1 to 21 further comprising a plasticizer.

23. A solid electrolyte as set forth in clause 22 wherein the plasticizer is selected from one or more of the group consisting of phthalate esters, phosphate ester plasticizers, phosphoric esters, fatty acid esters, esters of azelaic acid, esters of sebacic acid, trimellitic esters and polymeric plasticizers.

24. A solid electrolyte as set forth in clause 23 wherein the plasticizer is a phthalate ester.

25. A solid electrolyte as set forth in clause 24 wherein the plasticizer is benzyl n-butyl phthalate.

26. A solid electrolyte as set forth in any one of clauses 1 to 25 wherein the dopant is a lithium salt.

27. A solid electrolyte as set forth in clause 26 wherein the lithium salt is selected from one or more of the group consisting of lithium perchlorate ($LiClO_4$), lithium tetrafluoroborate ($LiBF_4$), lithium hexafluorophosphate ($LiPF_6$), lithium bis(trifluoromethanesulfonyl)imide, lithium bis(trifluoromethane)sulfonimide ($Li[N(CF_3SO_2)_2]$), lithium hexafluoroarsenate(V) ($LiAsF_6$), lithium bis(oxalatoborate), lithium nitrate ($LiNO_3$), lithium chloride (LiCl) and lithium bromide (LiBr).

28. A solid electrolyte as set forth in clause 27 wherein the lithium salt is selected from one or more of the group consisting of lithium tetrafluoroborate, lithium bis(trifluoromethanesulfonyl)imide and lithium chloride.

29. A solid electrolyte as set forth in clause 28 wherein the lithium salt is lithium tetrafluoroborate.

30. A solid electrolyte as set forth in clause 28 wherein the lithium salt is lithium chloride.

31. A solid electrolyte as set forth in any one of clauses 1 to 25 wherein the dopant is a sodium salt.

32. A solid electrolyte as set forth in clause 31 wherein the sodium salt is selected from one or more of the group consisting of sodium nitrate ($NaNO_3$), sodium perchlorate ($NaClO_4$), sodium tetrafluoroborate ($NaBF_4$), sodium hexafluorophosphate ($NaPF_6$), sodium bis(trifluoromethanesulfonyl)imide, sodium bis(trifluoromethane)sulfonimide (Na[N(CF$_3$SO$_2$)$_2$]) Na[N(CF$_3$SO$_2$)$_2$], sodium hexafluoroarsenate(V) (NaAsF$_6$) sodium bis(oxalatoborate), sodium halides, sodium thiocyanate (NaSCN), sodium pentacyanopropenide, sodium tetracyanopirolate and sodium tricyanoimidazolate.

33. A solid electrolyte as set forth in any one of clauses 1 to 32 further comprising a lithium ion-conducting ceramic or a sodium ion-conducting ceramic.

34. A solid electrolyte as set forth in clause 33 wherein the lithium ion-conducting ceramic is selected from one or more of the group consisting of NASICON-type ceramics, lithium-stuffed garnet-type oxides, LISICON-type ceramics, Perovskite-type oxides, solid solutions in the Li$_3$PO$_4$—Li$_4$SiO$_4$ pseudobinary system Li$_{3+x}$(P$_{1-x}$Si$_x$)O$_4$, and lithium-ion conducting oxyhalide glasses.

35. A solid electrolyte as set forth in clause 34 wherein the NASICON-type ceramics are of the general formula LiM$_2$(PO$_4$)$_3$, where M is Ge, Ti, Hf, Sn and/or Zr; Li$_{1+x}$A$_x$Ti$_{2-x}$(PO$_4$)$_3$ (LTAP), where A is trivalent cation such as Al, Sc, Y or La, or Li$_{1+x}$Al$_x$Ge$_{2-x}$(PO$_4$)$_3$.

36. A solid electrolyte as set forth in clause 34 wherein the lithium-stuffed garnet-type oxides are of the general formula Li$_{7-3y-x}$La$_3$Zr$_{2-x}$M1$_y$M2$_x$O$_{12}$, where M1 is a trivalent cation such as Al and/or Ga and/or M2 is pentavalent cation such as Nb and/or Ta, and x≥0, y≤2; Li$_5$La$_3$M$_2$O$_{12}$, where M is Nb and/or Ta with an aliovalent dopant on the M site; Li$_6$BaLa$_2$Ta$_2$O$_{12}$; or Li$_{6.5}$La$_{2.5}$Ba$_{0.5}$ZrTaO$_{12}$.

37. A solid electrolyte as set forth in clause 34 wherein the LISICON-type ceramics are selected from one or more of the group consisting of Li$_{2+2x}$Zn$_{1-x}$Ge$_4$O$_{16}$ and Li$_{14}$ZnGeO$_{16}$.

38. A solid electrolyte as set forth in clause 34 wherein the Perovskite-type oxide are of general formula Li$_{3x}$La$_{(2/3)-x}$TiO$_3$.

39. A solid electrolyte as set forth in clause 34 wherein the oxyhalide glasses have the general formula LiX—Li$_2$O—B$_2$O$_3$, LiX—Li$_2$O—SiO$_2$ or LiX—Li$_2$O-M$_2$O$_5$ where X is F, Cl, Br or I and M is P, As or V.

40. A solid electrolyte as set forth in clause 35 wherein the ceramic is a NASICON-type fast Li-ion ceramic.

41. A solid electrolyte as set forth in clause 40 wherein the ceramic is Li$_{1+x}$Al$_x$Ge$_{2-x}$(PO$_4$)$_3$ (LAGP).

42. A solid electrolyte as set forth in clause 41 wherein the ceramic is Li$_{1+x}$Al$_x$Ge$_{2-x}$(PO$_4$)$_3$ (x=0.5).

43. A solid electrolyte as set forth in clause 33 wherein the sodium ion-conducting ceramic oxide is selected from one or more of the group consisting of NaSICON-structured oxides, beta-alumina and beta"-alumina phases Na$_2$O.nAl$_2$O$_3$ where 5≤n≤11, sodium rare earth silicates, and sodium ion conducting oxyhalide glasses.

44. A solid electrolyte as set forth in clause 43 wherein NaSICON-structured oxides have the general formula Na$_3$Zr$_2$Si$_2$PO$_{12}$, NaTi$_2$(PO$_4$)$_3$, NaGe$_2$(PO$_4$)$_3$, or Na$_{1+x}$[Sn$_x$Ge$_{2-x}$(PO$_4$)$_3$].

45. A solid electrolyte as set forth in clause 43 wherein sodium rare earth silicates have the general formula Na$_5$MSi$_4$O$_{12}$ where M is Y, Sc, Lu and/or any trivalent rare earth cation.

46. A solid electrolyte as set forth in clause 43 wherein the sodium ion conducting oxyhalide glass is NaI—NaCl—Na$_2$O—B$_2$O$_3$ 47. A solid electrolyte as set forth in any one of clauses 1 to 32 wherein the first polymer is present in an amount of from 15 to 30 wt %.

48. A solid electrolyte as set forth in any one of clauses 19 to 32 the second polymer is present in an amount of from 30 to 50 wt 49. A solid electrolyte as set forth in any one of clauses 22 to 32 wherein the plasticizer is present in an amount of from 10 to 25 wt %.

50. A solid electrolyte as set forth in any one of clauses 1 to 32 wherein the lithium or sodium salt is present in an amount of from 15 to 30 wt %.

51. A solid electrolyte as set forth in any one of clauses 22 to 32 wherein the solid electrolyte comprises from 10 to 25 wt % plasticizer, from 15 to 30 wt % polyvinyl acetal, from 15 to 30 wt % lithium or sodium salt and from 30 to 50 wt % PvDF.

52. A solid electrolyte as set forth in any one of clauses 22 to 32 wherein the solid electrolyte comprises from 15 to 20 wt % plasticizer, from 20 to 25 wt % polyvinyl acetal, from 20 to 25 wt % lithium or sodium salt and from 35 to 45 wt % PvDF.

53. A solid electrolyte as set forth in any one of clauses 22 to 32 wherein the solid electrolyte comprises 16% plasticizer, 21 wt % polyvinyl acetal, 21 wt % lithium or sodium salt and 42 wt % PvDF.

54. A solid electrolyte as set forth in any one of clauses 33 to 46 wherein a ceramic is present at a level of from 0.1 wt % to 90 wt, or from 1 wt % to 90 wt %, or from 5 wt % to 90 wt %, or from 10 wt % to 90 wt, or from 20 wt % to 90 wt %, or from 30 wt % to 90 wt %, or from 40 wt % to 90 wt %, or from 50 wt % to 90 wt %.

55. A solid electrolyte as set forth in any one of clauses 33 to 46 wherein a ceramic is present at a level of from 60 wt % to 90 wt %.

56. A solid electrolyte as set forth in clause 55 which comprises from 60 to 90 wt % fast lithium ion conducting ceramic, from 1 to 5 wt % plasticizer, from 2 to 8 wt % polyvinyl acetal, from 2 to 8 wt % lithium salt and from 4 to 15 wt % PvDF.

57. A solid electrolyte as set forth in clause 56 which comprises from 70 to 85 wt % fast lithium ion conducting ceramic, from 2 to 4 wt % plasticizer, from 3 to 6 wt % polyvinyl acetal, from 3 to 6 wt % lithium salt and from 4 to 15 wt % PvDF.

58. A solid electrolyte as set forth in clause 57 which comprises from 78 to 82 wt % fast lithium ion conducting ceramic, from 2 to 4 wt % plasticizer, from 3 to 5 wt % polyvinyl acetal, from 3 to 6 wt % lithium salt and from 7 to 10 wt % PvDF.

59. A solid electrolyte as set forth in clause 55 which comprises from 60 to 90 wt % fast sodium ion conducting ceramic, from 1 to 5 wt % plasticizer, from 3 to 6 wt % polyvinyl acetal, from 2 to 8 wt % sodium salt and from 4 to 15 wt % PvDF.

60. A solid electrolyte as set forth in clause 59 which comprises from 70 to 85 wt % fast sodium ion conducting ceramic, from 2 to 4 wt % plasticizer, from 3 to 6 wt % polyvinyl acetal, from 3 to 6 wt % sodium salt and from 6 to 12 wt % PvDF.

61. A solid electrolyte as set forth in clause 60 which comprises from 78 to 82 wt % fast sodium ion conducting ceramic, from 2 to 4 wt % plasticizer, from 3 to 5 wt % polyvinyl acetal, from 3 to 6 wt % sodium salt and from 7 to 10 wt % PvDF.

62. A solid electrolyte as set forth in clause 55 which comprises from 60 to 90 wt % LAGP, from 1 to 5 wt % benzyl butyl phthalate, from 2 to 8 wt % polyvinyl butyral, from 2 to 8 wt % LiBF$_4$ and from 4 to 15 wt % PVDF.

63. A solid electrolyte as set forth in clause 62 which comprises from 70 to 85 wt % LAGP, from 2 to 4 wt % benzyl butyl phthalate, from 3 to 6 wt % polyvinyl butyral, from 3 to 6 wt % LiBF$_4$ and from 6 to 12 wt % PVdF.

64. A solid electrolyte as set forth in clause 63 which comprises from 78 to 82 wt % LAGP, from 2 to 4 wt % benzyl butyl phthalate, from 3 to 5 wt % polyvinyl butyral, from 3 to 5 wt % $LiBF_4$ and from 7 to 10 wt % PVdF.

65. A solid electrolyte as set forth in clause 64 which comprises 81 wt % LAGP, 3 wt % benzyl butyl phthalate, 4 wt % polyvinyl butyral, 4 wt % $LiBF_4$ and 8 wt % PVdF.

66. A solid electrolyte as set forth in clause 55 which comprises from 60 to 90 wt % garnet-related Ta-doped lithium lanthanum zirconate, from 2 to 8 wt % plasticizer, from 2 to 8 wt % polyvinyl acetal, from 2 to 8 wt % lithium salt and from 4 to 15 wt % PVdF.

67. A solid electrolyte as set forth in clause 55 which comprises from 60 to 90 wt % garnet-related Nb-doped lithium lanthanum zirconate, from 2 to 8 wt % plasticizer, from 2 to 8 wt % polyvinyl acetal, from 2 to 8 wt % lithium salt and from 4 to 15 wt % PVdF.

68. A solid electrolyte as set forth in clause 55 which comprises from 60 to 90 wt % garnet-related Al-doped lithium lanthanum zirconate, from 2 to 8 wt % plasticizer, from 2 to 8 wt % polyvinyl acetal, from 2 to 8 wt % lithium salt and from 4 to 15 wt % PVdF.

69. A solid electrolyte as set forth in clause 55 which comprises from 60 to 90 wt % garnet-related Al,Ga-codoped lithium lanthanum zirconate, from 2 to 8 wt % plasticizer, from 2 to 8 wt % polyvinyl acetal, from 2 to 8 wt % lithium salt and from 4 to 15 wt % PVdF.

70. A solid electrolyte as set forth in clause 55 which comprises from 60 to 90 wt % garnet-related Ta,Ga-codoped lithium lanthanum zirconate, from 2 to 8 wt % plasticizer, from 2 to 8 wt % polyvinyl acetal, from 2 to 8 wt % lithium salt and from 4 to 15 wt % PVdF.

71. A solid electrolyte as set forth in clause 70 which comprises 80 wt % garnet-related Ta,Ga-codoped lithium lanthanum zirconate, 2 wt % benzyl butyl phthalate, 4 wt % polyvinyl butyral, 6 wt % LiCl and 8 wt % PVdF.

72. A solid electrolyte as set forth in clause 70 which comprises 82 wt % garnet-related Ta,Ga-codoped lithium lanthanum zirconate, 4 wt % polyvinyl butyral, 6 wt % LiCl and 8 wt % PVdF.

73. An ionically conductive membrane divider for use in a battery comprising a solid electrolyte as set forth in any one of clauses 1 to 72.

74. A battery comprising an anode, a cathode, a catholyte and, optionally, an anolyte, in which an ionically conductive membrane divider as set forth in clause 73 separates the catholyte from the anode.

75. A battery as set forth in clause 74 wherein the battery is a battery with a lithium anode.

76. A battery as set forth in clause 75 wherein the battery is a lithium-air battery or a lithium-sulfide battery.

77. A method of preparing an ionically conductive membrane divider suitable for use in a battery, comprising the steps of:
a) providing a solid electrolyte as set forth in any one of clauses 1 to 72; and
b) forming the solid electrolyte into a membrane.

78. A method as set forth in clause 77 wherein a slurry comprising the solid electrolyte is formed into a membrane by tape casting.

79. A method as set forth in clause 77 wherein the solid electrolyte is formed into a membrane by hot pressing.

DRAWINGS

Figure 3:
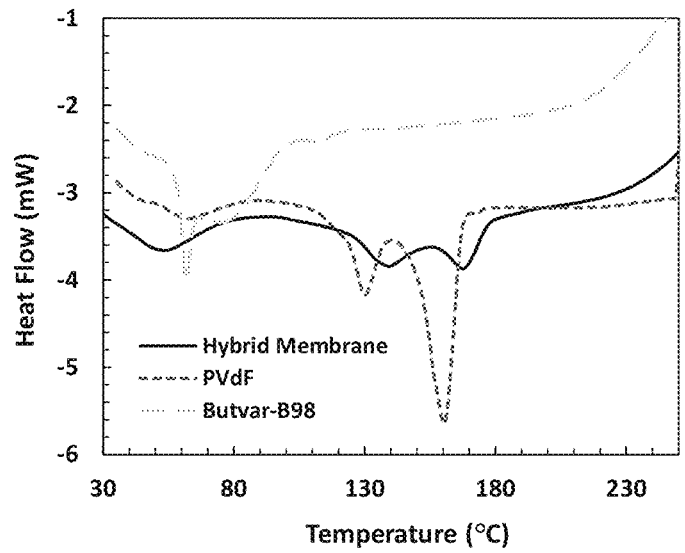

FIG. 3 displays a DSC measurement (30° C. to 250° C.) on a hybrid LAGP polymer membrane in accordance with the present invention after being immersed in deionized water for about a week.

Figure 4:
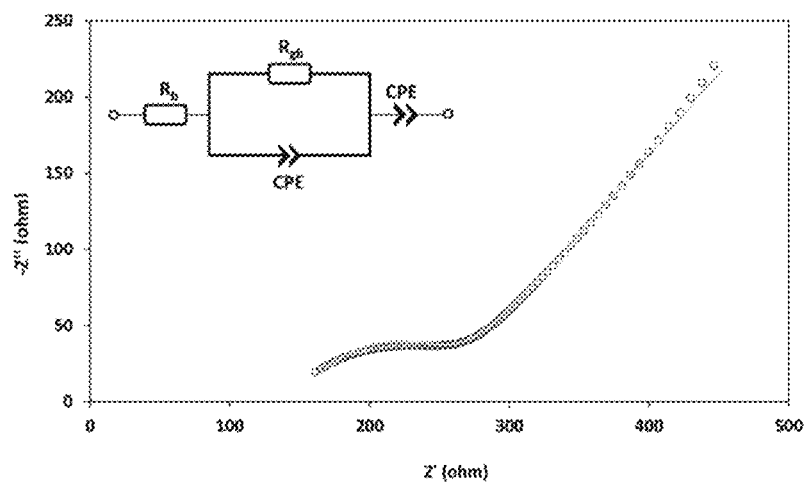
Figure 4:
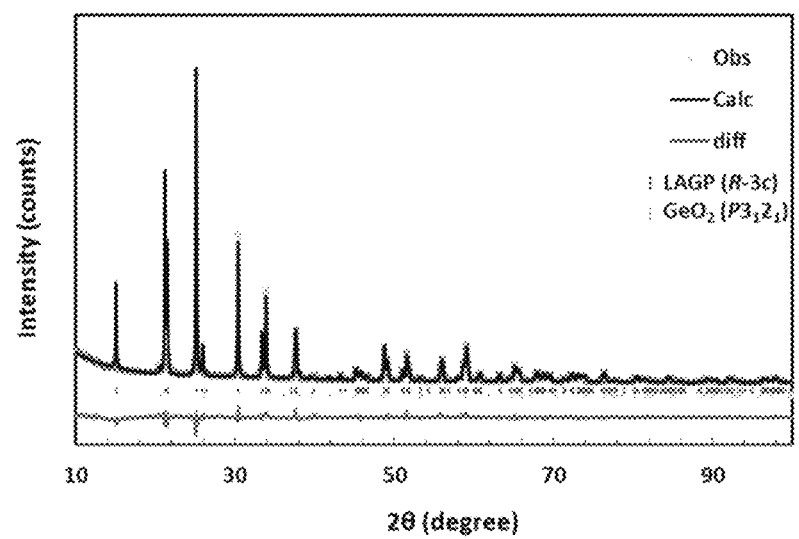

FIG. 4 shows (a) a room temperature Nyquist plot of a hybrid LAGP polymer membrane in accordance with the present invention (gold-sputtered; data fitted using FRA software and equivalent circuit of R(RQ)Q) and (b) a Rietveld refined powder XRD pattern for the hybrid membrane in accordance with the present invention. Vertical bars correspond to the calculated Bragg reflections from R-3c model for LAGP (top) and $P3_12_1$ model for $GeO_2$ (bottom).

Figure 5:
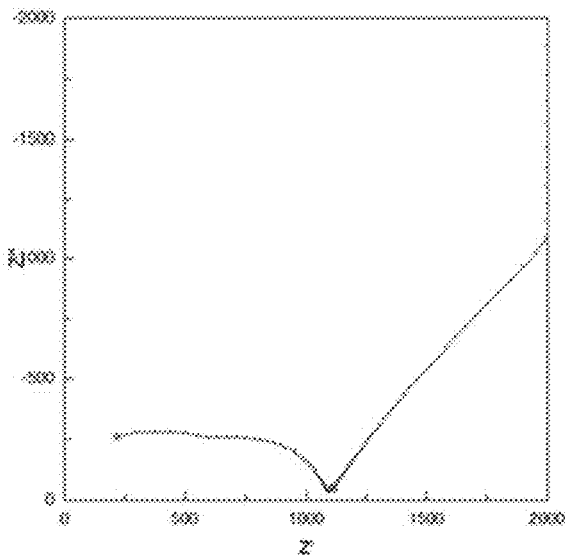
Figure 5:
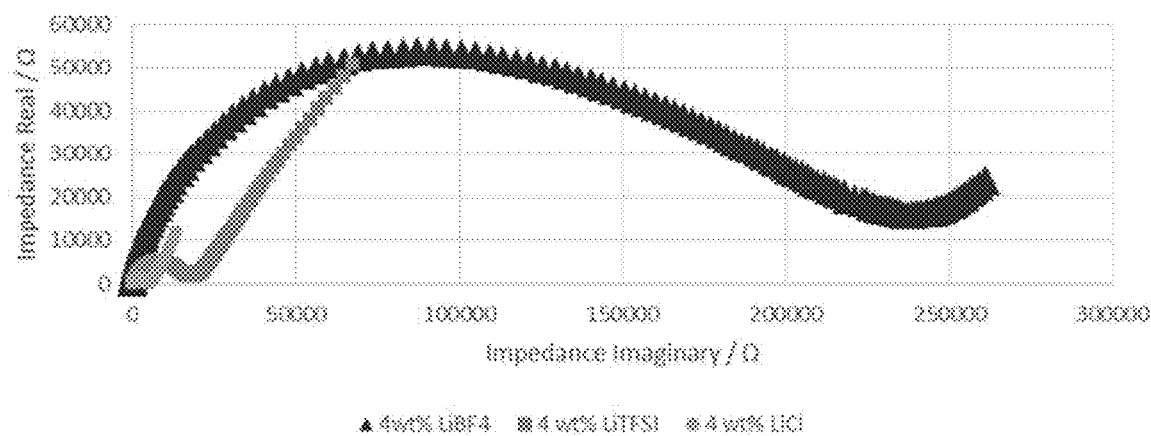

FIG. 5 (a) Room temperature Nyquist plot of impedance of hybrid membrane with garnet type Ta,Ga-codoped $Li_{6.75}La_3Zr_{1.75}Ta_{0.25}O_{12}Ga_{0.05}$ as the ceramic filler (b) effect of different doping salts on the conductivity of the hybrid membrane with the garnet type fillers (triangles 4% $LiBF_4$, squares: 4% LiTFSi, circle: 4% LiCl)

Figure 6:
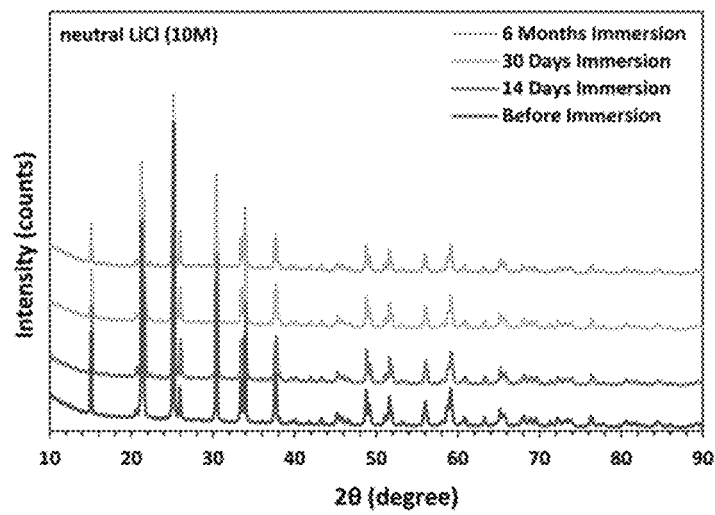
Figure 6:
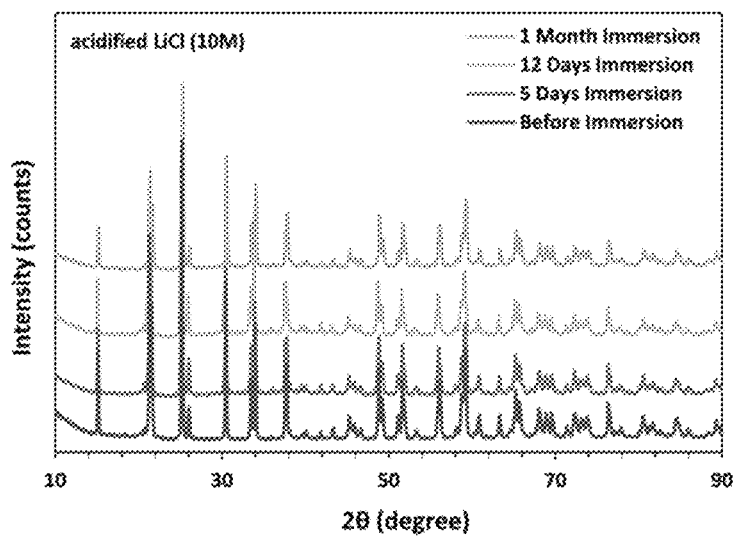

FIG. 6 is a XRD pattern of a hybrid inorganic-organic LAGP polymer membrane in accordance with the present invention before and after immersion in (a) slightly acidic LiCl (10 M, pH≈6) aqueous solution and (b) acidified LiCl (10 M, pH≈2).

Figure 7:
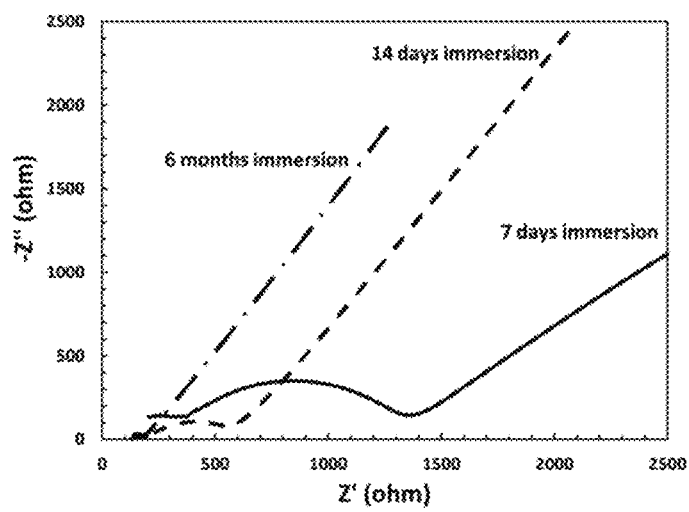

FIG. 7 displays the immersion time dependence of the room temperature Nyquist plot of impedance for the hybrid LAGP: polymer membrane in accordance with the present invention (no gold sputtering).

Figure 8:
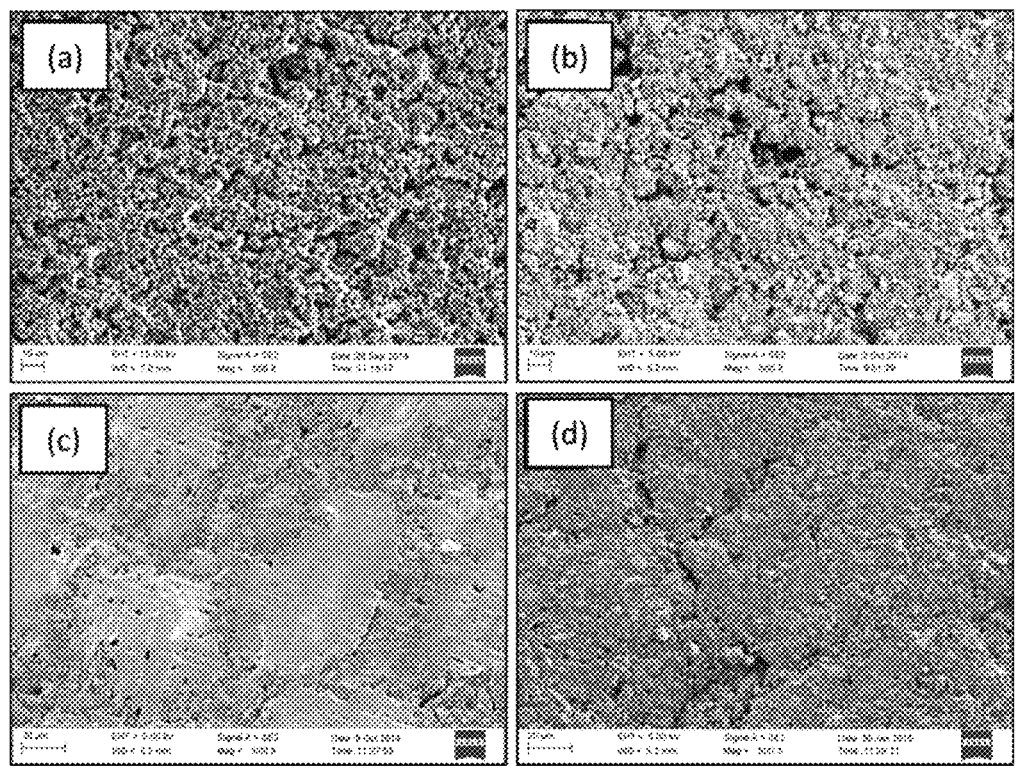

FIG. 8 displays SEM images of a hybrid LAGP polymer membrane in accordance with the present invention (a) before immersion, (b) after 7 days of immersion, (c) after 14 days of immersion and (d) after 6 months of immersion.

Figure 9:
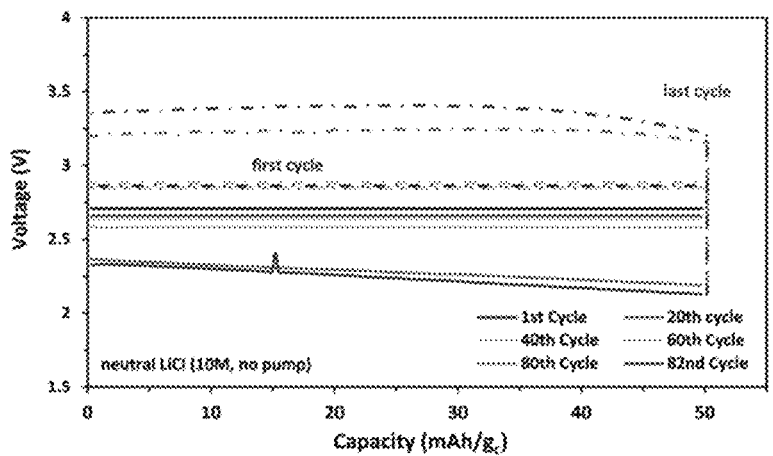
Figure 9:
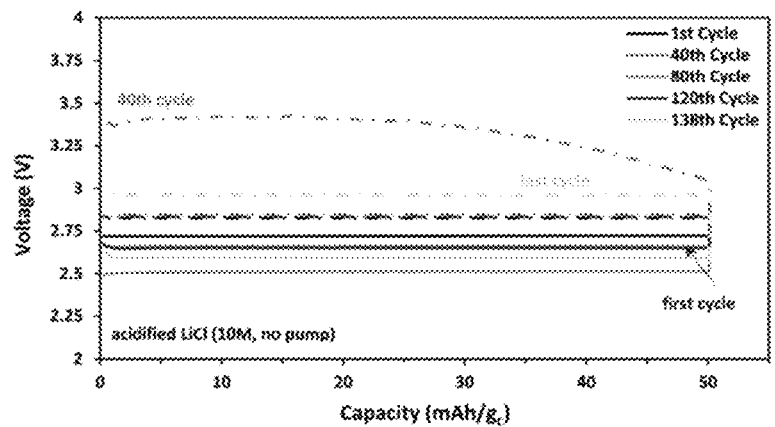
Figure 9:
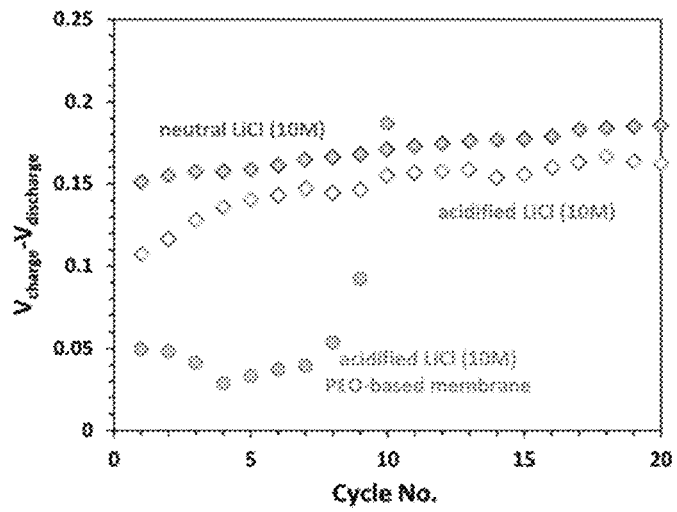

FIG. 9 displays charge/discharge profiles of an Li-air battery employing a hybrid LAGP polymer membrane in accordance with the present invention with (a) neutral LiCl (10 M), (b) acidified LiCl (10 M) under catholyte under constant current density of 0.03 mAcm$^{-2}$ (≈100 mA/g$_c$) and (c) cell overpotential vs. cycle number for the hybrid membrane and PEO-based membrane.

DESCRIPTION

The present invention relates to a solid electrolyte suitable for use in a battery comprising a first polymer selected from one or more of the group consisting of a polyvinyl acetal, polyvinyl acetate, and a copolymer comprising vinyl acetal and/or vinyl acetate units, doped with a lithium or sodium salt. In particular it relates to an ionically conductive membrane divider made from this material and to a scalable method of fabrication of such a membrane. Such a membrane divider is mechanically flexible and highly stable. The membrane divider may be used in batteries that contain an anode which would be degraded by contact with an aqueous electrolyte to protect the anode. In particular they may be employed as anode-protecting membrane when located between an anode (or an anode chamber containing an organic anolyte) and a liquid catholyte or electrolyte in a Li-air battery. However the solid electrolyte may also be used in all-solid state Li-ion batteries and in other applications such as in sodium ion batteries and in redox flow batteries.

As used herein the term "solid electrolyte" refers to solids with highly mobile ions. These materials are also known as "fast ion conductors" and "superionic conductors". Fast ion conductors are intermediate in nature between crystalline solids which possess a regular structure with immobile ions, and liquid electrolytes which have no regular structure and fully mobile ions. These materials exhibit exceptionally high values of ionic conductivity due to the rapid diffusion of an ionic species through a lattice. Often the lattice is formed by immobile counterions but a salt dissolved in a polymer or dispersed in an organic matrix can also act as a fast ion conductor As used herein a "dopant", also called a "doping agent", is a material that is inserted into a substance to alter the electrical or optical properties of the substance. That substance is said to have been "doped". As used herein a polymer may be doped to increase electrical conductivity as so to produce a solid electrolyte by the introduction of a salt.

As used herein, the term "polyvinyl acetal" refers to polymers that comprise a plurality of vinyl acetal units in the polymer backbone. In particular, the term refers to polymers that comprise a plurality of 1,3-dioxane moieties in the polymer backbone. Typically 1,3-dioxane moieties are bound to adjacent carbon atoms in the backbone at the 4- and 6-positions.

Polyvinyl acetals are prepared by modification of polyvinyl acetate. As a first step, polyvinyl acetate is hydrolysed to form polyvinyl alcohol. Polyvinyl alcohol is then modified by reaction with an aldehyde to obtain a polyvinyl acetal. However neither reaction proceeds to completion. Thus, in addition to the vinyl acetal groups, polyvinyl acetals contain units derived from vinyl acetate and/or vinyl alcohol. For example, polyvinylbutyral is prepared from polyvinyl alcohol by reaction with butyraldehyde, but contains units derived from vinyl acetate and/or vinyl alcohol in addition to vinylbutyral units.

As used herein, the term "polyvinyl acetal itself" refers to the specific reaction product of polyvinyl alcohol (which may contain polyvinyl acetate residues as discussed in the definition of "polyvinyl acetal" above) with acetaldehyde which, coincidentally, takes the same name as the overall class of polymers.

As used herein the term "alkyl" refers to a branched or straight chain monovalent saturated aliphatic hydrocarbon moiety of one to twenty carbon atoms which is unsubstituted unless specifically stated otherwise. This term includes, but is not limited to such moieties as methyl, ethyl, propyl, butyl, pentyl, hexyl, heptyl, octyl, nonyl and so on, and in the instances where there are three or more carbons, the various isomeric forms for each moiety. For example, butyl includes, isobutyl, n-butyl, and tert-butyl; and propyl includes n-propyl, and isopropyl. An alkyl moiety is commonly a $C_{1-6}$ alkyl.

As used herein, the term "alkoxy" refers to the moiety —O—R' where R' is alkyl.

As used herein, the term "thioalkyl" refers to the moiety —S—R' where R' is alkyl.

As used herein, the terms "carboxy" or "carboxylic acid" refer to the moiety —C(O)OH.

As used herein, the term "alkoxycarbonyl" refers to the moiety —C(O)OR' where R' is alkyl.

As used herein, the term "carbamoyl" refers to the moiety —C(O)NR'R where R and R' are independently hydrogen or alkyl, e.g., where R is hydrogen and R' is alkyl the group is alkylcarbamoyl, where R and R' are each alkyl the group is dialkylcarbamoyl.

As used herein, the term "thiocarbamoyl" refers to the moiety —C(S)NR'R where R and R' are independently hydrogen or alkyl, e.g., where R is hydrogen and R' is alkyl the group is alkylthiocarbamoyl, where R and R' are each alkyl the group is dialkylthiocarbamoyl.

As used herein, the term "halo" refers to fluoro, bromo, chloro and iodo.

As used herein the term "polymer" refers to a homopolymer or a copolymer.

As used herein the term "homopolymer" refers to a polymer formed from a single type of monomer. It will be appreciated that a homopolymer may nevertheless contain some units other than units derived from that monomer due to side reactions or incomplete reactions, particularly if they are prepared by modification of another polymer. For example, polyvinyl alcohol is made by hydrolysis of polyvinyl acetate and it cannot be assured that all side chains will hydrolyse. Polyvinyl acetals are made by the reaction of polyvinyl alcohol with an aldehyde, and it may not be that all alcohol groups react. Therefore polyvinyl acetal homopolymer may contain minor amounts of residues of both polyvinyl alcohol and polyvinyl acetate.

As used herein in relation to polymers, the term "unit" or its plural "units" refers to the portion of a monomer that remains following polymerisation. A "unit" may be modified in post-polymerisation reaction.

As used herein the term "copolymer" refers to a polymer formed from more than a single type of monomer and includes various forms of copolymers such as alternating copolymers, block copolymers and graft copolymers.

In an embodiment the polyvinyl acetal includes units with the structure set forth in Formula I:

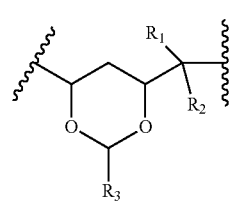

(I)

wherein $R_1$ and $R_2$ are independently selected from hydrogen, alkyl and alkyl substituted with hydroxyl, thiol, amino, halo, nitro, alkoxy, thioalkyl, alkylamino, dialkylamino, carboxy, alkoxycarbonyl, carbamoyl, thiocarbamoyl, alkylcarbamoyl, alkylthiocarbamoyl, dialkylcarbamoyl or dialkylthiocarbamoyl, typically $C_{1-6}$ alkyl; and $R_3$ is selected from hydrogen, alkyl and alkyl substituted with hydroxyl, thiol, amino, halo, nitro, alkoxy, thioalkyl, alkylamino, dialkylamino, carboxy, alkoxycarbonyl, carbamoyl, thiocarbamoyl, alkylcarbamoyl, alkylthiocarbamoyl, dialkylcarbamoyl or dialkylthiocarbamoyl, typically $C_{1-6}$ alkyl.

In an embodiment $R_1$ and $R_2$ are independently selected from hydrogen and alkyl.

In an embodiment $R_1$ and $R_2$ are each hydrogen.

In an embodiment $R_3$ is selected from hydrogen and alkyl.

In an embodiment $R_3$ is alkyl.

In an embodiment $R_3$ is methyl.

In an embodiment $R_3$ is propyl.

In an embodiment $R_3$ is n-propyl.

In an embodiment $R_3$ is hydrogen.

In an embodiment the first polymer is polyvinyl butyral. Polyvinyl butyral is sold, for example by Eastman Chemical under the name BUTVAR.

In an embodiment the first polymer is polyvinyl acetal itself. This polymer was formerly sold by the Monsanto under the name ALVAR.

In an embodiment the first polymer is polyvinyl formyl. Polyvinyl formyl was originally sold, by the Monsanto Chemical Company under the name FORMVAR but is now sold as VINYLEC by JNC Corporation.

In an embodiment the first polymer is a copolymer having vinyl acetal units and units derived from the group consisting of vinyl acetate, vinyl alcohol, (meth)acrylic acid and methyl (meth)acrylate.

In an embodiment the copolymer has vinyl acetal units and units derived from vinyl acetate and/or vinyl alcohol.

In an embodiment the copolymer comprises from 73 to 84% vinyl acetate units, from 15% to 25% vinyl alcohol units and from 1 to 2% vinyl acetate units.

In an embodiment the copolymer comprises from 76 to 81% vinyl acetate units, from 18% to 22%, vinyl alcohol units and from 1 to 2% vinyl acetate units.

In an embodiment the copolymer comprises from 78 to 79% vinyl acetate units, about 20% vinyl alcohol units and from 1 to 2% for vinyl acetate units.

In an embodiment the solid electrolyte further comprises a second polymer selected from one or more of the group consisting of polyvinylidene difluoride (PVdF), polyvinyl alcohol, a polyolefin-based resin, poly(propylene carbonate), a polyester-based resin, tetrafluoroethylene, a vinylidene difluoride-hexafluoropropylene copolymer, a vinylidene difluoride-perfluorovinylether copolymer, a vinylidene difluoride-tetrafluoroethylene copolymer, a vinylidene difluoride-trifluoroethylene copolymer, a vinylidene difluoride-fluoroethylene copolymer, a vinylidene difluoride-hexafluoroacetone copolymer, a vinylidene difluoride-ethylene copolymer, a vinylidene difluoride-propylene copolymer, a vinylidene difluoride-trifluoropropylene copolymer, a vinylidene difluoride-tetrafluoroethylene-hexafluoropropylene copolymer and a vinylidene difluoride-ethylene-tetrafluoroethylene copolymer. The polyolefin-based resin may be polyethylene, polypropylene, or the like; and the polyester-based resin may be polyethylene terephthalate, polybutylene terephthalate, or the like.

In an embodiment the second polymer is selected from one or more of the group consisting of polyvinylidene difluoride (PVdF), polyvinyl alcohol, a polyolefin-based resin, poly(propylene carbonate), tetrafluoroethylene. Typically the polyolefin-based resin is polyethylene.

In an embodiment the second polymer is polyvinylidene difluoride (PVdF).

In an embodiment the solid electrolyte further comprises inert components selected from one or more of the group consisting of fillers, antioxidants, colouring agents, antifouling agents and dispersants.

In an embodiment the solid electrolyte further comprises a plasticizer.

In an embodiment the plasticizer is selected from one or more of the group consisting of phthalate esters, phosphate ester plasticizers, phosphoric esters, fatty acid esters, esters of azelaic acid, esters of sebacic acid, trimellitic esters and polymeric plasticizers. In an embodiment phthalate esters are used. In an embodiment the plasticizer is benzyl n-butyl phthalate.

Solid polymer electrolytes for lithium and sodium ion batteries comprise low lattice energy lithium and sodium salts as dopant for a polymer or polymer blend.

In an embodiment the dopant is a lithium salt.

In an embodiment the dopant is selected from one or more of the group consisting of lithium perchlorate ($LiClO_4$), lithium tetrafluoroborate ($LiBF_4$), lithium hexafluorophosphate ($LiPF_6$), lithium bis(trifluoromethanesulfonyl)imide (LiTFSI), lithium bis(trifluoromethane)sulfonimide ($Li[N(CF_3SO_2)_2]$), lithium hexafluoroarsenate(V) ($LiAsF_6$), lithium bis(oxalatoborate) ("LiBOB"), lithium nitrate ($LiNO_3$), lithium chloride (LiCl) and lithium bromide (LiBr).

In an embodiment the dopant is lithium tetrafluoroborate ($LiBF_4$).

In an embodiment the dopant is a sodium salt.

In an embodiment the dopant is selected from one or more of the group consisting of, sodium nitrate ($NaNO_3$), sodium perchlorate ($NaClO_4$), sodium tetrafluoroborate ($NaBF_4$), sodium hexafluorophosphate ($NaPF_6$), sodium bis(trifluoromethanesulfonyl)imide (NaTFSI), sodium bis(trifluoromethane)sulfonimide ($Na[N(CF_3SO_2)_2]$), sodium hexafluoroarsenate(V) ($NaAsF_6$), sodium bis(oxalatoborate) ("NaBOB"), sodium halides (NaX), where X=Cl, Br or I, sodium thiocyanate (NaSCN), sodium pentacyanopropenide (NaPCPI), sodium tetracyanopirolate (NaTCP) and sodium tricyanoimidazolate (NaTIM).

The solid electrolyte may further comprise a ceramic. Any suitable ion-conducting ceramic can be used.

In an embodiment the solid electrolyte further comprises a lithium ion-conducting ceramic or a sodium ion-conducting ceramic.

In an embodiment the lithium ion-conducting ceramic is selected from one or more of the group consisting of NASICON-type ceramics, lithium-stuffed garnet-type oxides, LISICON-type ceramics, Perovskite-type oxides, solid solutions in the $Li_3PO_4$—$Li_4SiO_4$ pseudobinary system $Li_{3+x}(P_{1-x}Si_x)O_4$ and lithium-ion conducting oxyhalide glasses.

In an embodiment the NASICON-type ceramics are of the general formula $LiM_2(PO_4)_3$ where M is Ge, Ti, Hf, Sn or Zr; $Li_{1+x}A_xTi_{2-x}(PO_4)_3$ (LTAP) where A is trivalent cation such as Al, Sc, Y and/or La; or $Li_{1+x}Al_xGe_{2-x}(PO_4)_3$.

In an embodiment the lithium-stuffed garnet-type oxides are of the general formula $Li_{7-3y-x}La_3Zr_{2-x}M^1{}_yM^2{}_xO_{12}$ where $M^1$ is a trivalent cation such as Al, Ga and/or $M^2$ is pentavalent cation such as Nb and/or Ta, and x≥0, y≤2; $Li_5La_3M_2O_{12}$ where M is Nb and/or Ta with an aliovalent dopant on the M site; $Li_6BaLa_2Ta_2O_{12}$; or $Li_{6.5}La_{2.5}Ba_{0.5}ZrTaO_{12}$.

In an embodiment the LISICON-type ceramics are selected from one or more of the group consisting of $Li_{2+2x}Zn_{1-x}Ge_4O_{16}$ and $Li_{14}ZnGeO_{16}$.

In an embodiment the Perovskite-type oxides are of general formula $Li_{3x}La_{(2/3)-x}TiO_3$.

In an embodiment the oxyhalide glasses have the general formula LiX—$Li_2O$—$B_2O_3$, LiX—$Li_2O$—$SiO_2$ or LiX—$Li_2O$-$M_2O_5$ where X is F, Cl, Br or I and M is P, As or V.

In an embodiment the ceramic is a NASICON-type fast Li-ion ceramic.

In an embodiment the ceramic is LAGP.

In an embodiment the ceramic is a $Li_{1+x}Al_xGe_{2-x}(PO_4)_3$ (x=0.5) glass.

In an embodiment the sodium ion-conducting ceramic is selected from one or more of the group consisting of NaSICON-structured oxides, beta-alumina and beta"-alumina phases $Na_2O \cdot nAl_2O_3$ where $5 \leq n \leq 11$, sodium rare earth silicates, and sodium ion conducting oxyhalide glasses.

In an embodiment the NaSICON-structured oxides have the general formula $Na_3Zr_2Si_2PO_{12}$, $NaTi_2(PO_4)_3$, $NaGe_2(PO_4)_3$, or $Na_{1+x}[Sn_xGe_{2-x}(PO_4)_3]$.

In an embodiment the sodium rare earth silicates have the general formula $Na_5MSi_4O_{12}$ where M is Y, Sc, Lu, and/or any trivalent rare earth cation.

In an embodiment the sodium ion conducting oxyhalide glass is NaI—NaCl—$Na_2O$—$B_2O_3$.

A fast ion conducting ceramic may be present or absent. If present the conductivity is increased by several orders of magnitude and the mechanical stability is markedly increased, which includes the stability against the penetration by lithium dendrites. When it is present ceramic typically makes up 60 to 90 wt % of the composition, but may be present in amounts of from 0.1 wt % to 90 wt %.

In an embodiment in which ceramic is absent, the first polymer can be present in an amount of from 15 to 30 wt %. Alternatively the first polymer can be present in an amount of from 20 to 25 wt %. Typically the first polymer is present in an amount of 21 wt %.

In an embodiment in which ceramic is absent, the second polymer can be present in an amount of from 30 to 50 wt %. Alternatively the second polymer can be present in an amount of from 35 to 45 wt %. Typically the second polymer is present in an amount of 42 wt %.

In an embodiment in which ceramic is absent, the plasticizer can be present in an amount of from 10 to 25 wt %. Alternatively the plasticizer can be present in an amount of from 15 to 20 wt %. Typically the plasticizer is present in an amount of 16 wt %.

If ceramic is absent any ion may be used to carry charge across the appropriately doped membrane since it need not be compatible with the ceramic Therefore any dopant salt that dissolves in the polymer in suitable quantities may be used. The salt is typically present in an amount of from 1 to 40 wt %.

Typically the salt is a sodium or lithium salt. In an embodiment in which ceramic is absent, the sodium or lithium salt can be present in an amount of from 15 to 30 wt %. Alternatively the sodium or lithium salt can be present in an amount of from 20 to 25 wt %. Typically the sodium or lithium salt is present in an amount of 21 wt %.

In an embodiment the solid electrolyte, in the absence of a ceramic, comprises from 10 to 25 wt % plasticizer, from 15 to 30 wt % polyvinyl acetal, from 15 to 30 wt % lithium or sodium salt and from 30 to 50 wt % PvDF.

In an embodiment the solid electrolyte, in the absence of a ceramic, comprises from 15 to 20 wt % plasticizer, from 20 to 25 wt % polyvinyl acetal, from 20 to 25 wt % lithium or sodium salt and from 35 to 45 wt % PvDF.

In an embodiment the solid electrolyte, in the absence of a ceramic, comprises 16 wt % plasticizer, 21 wt % polyvinyl acetal, 21 wt % lithium or sodium salt and 42 wt % PvDF.

Typically a ceramic is present to enhance conductivity and mechanical strength. While the presence of the ceramic enhances conductivity at any level, say from 0.1 wt % to 90 wt, or from 1 wt % to 90 wt %, or from 5 wt % to 90 wt %, or from 10 wt % to 90 wt, or from 20 wt % to 90 wt %, or from 30 wt % to 90 wt %, or from 40 wt % to 90 wt %, or from 50 wt % to 90 wt %, it is typically present in an amount from 60 wt % to 90 wt %. The amount of ceramic present will depend on the purpose to which an item fabricated from the solid electrolyte is put, the nature of the ceramic and other components of the solid electrolyte.

If a ceramic is present in an amount from 60 wt % to 90 wt % the first polymer is typically present in an amount of from 2 to 8 wt %. In an embodiment it the first polymer is present in an amount of from 3 to 6 wt %. In an embodiment it the first polymer is present in an amount of from 3 to 5 wt %.

If a ceramic is present in an amount from 60 wt % to 90 wt % the second polymer is typically present in an amount of from 4 to 15 wt %. In an embodiment the second polymer is present in an amount of from 6 to 12 wt %. In an embodiment the second polymer is present in an amount of from 7 to 10 wt %.

If a ceramic is present in an amount from 60 wt % to 90 wt % the plasticizer is typically present in an amount of from 1 to 5 wt %. In an embodiment the plasticizer is present in an amount of from 2 to 4 wt %.

If a ceramic is present in an amount from 60 wt % to 90 wt % either a sodium salt or a lithium salt is typically present in an amount of from 2 to 10 wt %. In an embodiment the sodium or lithium salt is present in an amount of from 3 to 6 wt %.

In an embodiment the solid electrolyte comprises from 60 to 90 wt % fast lithium ion conducting ceramic, from 1 to 5 wt % plasticizer, from 2 to 8 wt % polyvinyl acetal, from 2 to 10 wt % lithium salt and from 4 to 15 wt % PvDF.

In an embodiment the solid electrolyte comprises from 70 to 85 wt % fast lithium ion conducting ceramic, from 2 to 4 wt % plasticizer, from 3 to 6 wt % polyvinyl acetal, from 3 to 6 wt % lithium salt and from 6 to 12 wt % PvDF In an embodiment the solid electrolyte comprises from 78 to 82 wt % fast lithium ion conducting ceramic, from 2 to 4 wt % plasticizer, from 3 to 5 wt % polyvinyl acetal, from 3 to 6 wt % lithium salt and from 7 to 10 wt % PvDF In an embodiment the solid electrolyte comprises from 60 to 90 wt % fast sodium ion conducting ceramic, from 1 to 5 wt % plasticizer, from 2 to 8 wt % polyvinyl acetal, from 2 to 10 wt % sodium salt and from 4 to 15 wt % PvDF In an embodiment the solid electrolyte comprises from 70 to 85 wt % fast sodium ion conducting ceramic, from 2 to 4 wt % plasticizer, from 3 to 6 wt % polyvinyl acetal, from 3 to 6 wt % sodium salt and from 6 to 12 wt % PvDF In an embodiment the solid electrolyte comprises from 78 to 82 wt % fast sodium ion conducting ceramic, from 2 to 4 wt % plasticizer, from 3 to 5 wt % polyvinyl acetal, from 3 to 6 wt % sodium salt and from 7 to 10 wt % PvDF.

In an embodiment the solid electrolyte comprises from 60 to 90 wt % LAGP, from 1 to 5 wt % benzyl butyl phthalate, from 2 to 8 wt % polyvinyl butyral, from 2 to 10 wt % $LiBF_4$ and from 4 to 15 wt % PVdF.

In an embodiment the solid electrolyte comprises from 70 to 85 wt % LAGP, from 2 to 4 wt % benzyl butyl phthalate, from 3 to 6 wt % polyvinyl butyral, from 3 to 6 wt % $LiBF_4$ and from 6 to 12 wt % PVdF.

In an embodiment the solid electrolyte comprises from 78 to 82 wt % LAGP, from 2 to 4 wt % benzyl butyl phthalate, from 3 to 5 wt % polyvinyl butyral, from 3 to 5 wt % $LiBF_4$ and from 7 to 10 wt % PVdF.

In an embodiment the solid electrolyte comprises 81 wt % LAGP, 3 wt % benzyl butyl phthalate, 4 wt % polyvinyl butyral, 4 wt % $LiBF_4$ and 8 wt % PVdF.

In an embodiment the solid electrolyte comprises from 60 to 90 wt % garnet-related Ta-doped lithium lanthanum zirconate, from 2 to 8 wt % plasticizer, from 2 to 8 wt % polyvinyl acetal, from 2 to 8 wt % lithium salt and from 4 to 15 wt % PVdF.

In an embodiment the solid electrolyte comprises from 60 to 90 wt % garnet-related Nb-doped lithium lanthanum zirconate, from 2 to 8 wt % plasticizer, from 2 to 8 wt % polyvinyl acetal, from 2 to 8 wt % lithium salt and from 4 to 15 wt % PVdF.

In an embodiment the solid electrolyte comprises from 60 to 90 wt % garnet-related Al-doped lithium lanthanum zirconate, from 2 to 8 wt % plasticizer, from 2 to 8 wt % polyvinyl acetal, from 2 to 8 wt % lithium salt and from 4 to 15 wt % PVdF.

In an embodiment the solid electrolyte comprises from 60 to 90 wt % garnet-related Al,Ga-codoped lithium lanthanum zirconate, from 2 to 8 wt % plasticizer, from 2 to 8 wt % polyvinyl acetal, from 2 to 8 wt % lithium salt and from 4 to 15 wt % PVdF.

In an embodiment the solid electrolyte from 60 to 90 wt % garnet-related Ta,Ga-codoped lithium lanthanum zirconate, from 2 to 8 wt % plasticizer, from 2 to 8 wt % polyvinyl acetal, from 2 to 8 wt % lithium salt and from 4 to 15 wt % PVdF.

In an embodiment the solid electrolyte comprises 80 wt % garnet-related Ta,Ga-codoped lithium lanthanum zirconate, 2 wt % benzyl butyl phthalate, 4 wt % polyvinyl butyral, 6 wt % LiCl and 8 wt % PVdF.

In an embodiment the solid electrolyte comprises 82 wt % garnet-related Ta,Ga-codoped lithium lanthanum zirconate, 4 wt % polyvinyl butyral, 6 wt % LiCl and 8 wt % PVdF.

A full cell battery will comprise an anode, a cathode, a catholyte and, optionally, an anolyte, in which an ionically conductive membrane divider separates the catholyte from the anode and the anolyte where present, wherein the membrane divider is a divider. The nature of the anode and the cathode depend on the type of battery. The selection of suitable materials for the anode and cathode in a battery is well understood by the person skilled in the art.

By way of example only, in a lithium ion battery the cathode is typically made from an intercalated lithium compound, such as lithium cobalt oxide, lithium nickel oxide, lithium nickel cobalt oxide, spinel-type lithium manganese oxide and manganese oxide, as one electrode material.

In a Li-air battery, or any lithium battery, lithium metal or lithium metal alloys are the typical anode choice. Likewise the anode in a sodium batter is typically sodium metal or a sodium metal alloy including but not limited to alloys of antimony (Sb), tin (Sn), phosphorus (P), germanium (Ge) or lead (Pb).

The anode in a lithium ion battery may be any suitable negative active material. For example, the negative active material may include a carbon-based material, a silicon-based material, a tin-based material, an antimony-based material, a lead-based material, a metal oxide (e.g. a lithium or sodium metal oxide). The carbon-based material may be, for example, soft carbon or hard carbon or a graphite-based material such as artificial graphite, natural graphite, a mixture of artificial graphite and natural graphite, natural graphite coated with artificial graphite, or the like. Carbon nanotube materials may be used. The silicon-based material may be, for example, silicon, a silicon oxide, a silicon-containing alloy, a mixture of the graphite-based material with the foregoing materials, or the like. The silicon oxide may be represented by $SiO_x (0<x\leq 2)$. The silicon-containing alloy may be an alloy including silicon in the largest amount of the total metal elements (e.g., silicon being the metal element that is present in the largest amount of all the metal elements) based on the total amount of the alloy, for example, a Si—Al—Fe alloy. The tin-based material may be, for example, tin, a tin oxide, a tin-containing alloy, a mixture of the graphite-based material with the foregoing materials, or the like. Likewise for antimony and lead-based materials. The lithium metal oxide may be, for example, a titanium oxide compound such as $Li_4Ti_5O_{12}$, $Li_2Ti_6O_{13}$ or $Li_2Ti_3O_7$. The sodium metal oxide may be, for example, a titanium oxide compound such as $Na_2Ti_3O_7$ or $Na_2Ti_6O_{13}$. Other metal oxides that may be mentioned herein as suitable include, but are not limited to, $TiO_2$, $Fe_2O_3$, $MoO_3$.

The anode in a sodium ion battery may be made a variety of materials including a mix of activated carbon and titanium phosphate $NaTi_2(PO_4)_3$, $Na_xC_6$, hard carbon or the like.

By way of example, mesoporous carbon has been used as a cathode substrate in a Li-air cell with metal catalysts that enhance reduction kinetics and increase the cathode's specific capacity. Manganese, iron, cobalt, ruthenium, platinum, silver, or a mixture of cobalt and manganese are among the metal catalysts used. In particular, carbon nanotube (CNT)-supported Pt catalysts (Pt/CNT) or Pt/Ir catalysts and other transition-metal and nitrogen doped carbon phases may be used in Li-air batteries.

An aqueous Li-air battery typically consists of an anode, an aqueous electrolyte and a porous carbon cathode. The aqueous electrolyte combines lithium salts dissolved in water. However, lithium metal reacts violently with water and thus the aqueous design requires an ionically conductive membrane divider between the lithium and electrolyte. The hybrid Li-air battery design has an aqueous catholyte and a non-aqueous anolyte separated by an ionically conductive membrane divider.

Typically the catholyte salt, active or non-active, is a halogen (e.g., chlorine, bromine, or iodine) or nitrate or ammonium. In certain embodiments the active salt is a nitrate (e.g., $NH_4NO_3$) or a halide or an ammonium compound or it is a compound that dissolves, in the catholyte hydrolytically (e.g., a compound comprising a metal (e.g., $AlCl_3$). In specific embodiments the halide salt is an ammonium halide salt ($NH_4Br$, $NH_4Cl$, $NH_4I$) or a metal halide salt, wherein the metal may be lithium, aluminium or titanium, or more generally an alkaline metal or a transition metal. Lithium chloride (pH=6) and acidified lithium chloride (pH=2) as well as LiOH (pH≈12) may be used.

The anolyte, where present, may include an electrolyte salt in a non-aqueous solvent. The non-aqueous solvent may be, for example, cyclic carbonates (such as propylene carbonate, ethylene carbonate, butylene carbonate, fluoroethylene carbonate, chloroethylene carbonate, vinylene carbonate, and/or the like); linear carbonates (such as dimethyl carbonate, diethyl carbonate, ethylmethyl carbonate, and/or the like); cyclic esters (such as γ-butyrolactone, γ-valerolactone, and/or the like); linear esters (such as methyl formate, methyl acetate, methyl butyrate, and/or the like); tetrahydrofuran or a derivative thereof; ethers (such as 1,3-dioxane, 1,4-dioxane, 1,2-dimethoxy ethane, 1,4-dibutoxyethane, diglyme, tetraglyme, methyl diglyme, and/or the like); nitriles (such as acetonitrile, benzonitrile, and/or the like); dioxolane or a derivative thereof; ethylene sulfide; sulfolane; and/or sultone or a derivative thereof, which may be utilized singularly or as a mixture of two or more, without being limited thereto. A common non-aqueous solvent is a mixture of ethylene carbonate and dimethyl carbonate.

The electrolytic salt may be, for example, (a) an inorganic ion salt including lithium (Li), such as $LiClO_4$, $LiAsF_6$, $LiPF_6$, $LiPF_{6-x}(C_nF_{2n+1})_x$ (1<x<6, n=1 or 2), LiSCN, LiBr, LiCl, $Li_2SO_4$, $Li_2B_{10}Cl_{10}$, LiI, LiSCN, $LiPF_4(C_2O_4)$, $LiBF_4$, $LiPF_6$, or the like or (b) an organic ion salt including lithium such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ or (c)

an inorganic ion salt including sodium (Na), such as NaClO$_4$, NaAsF$_6$, NaPF$_6$, NaPF$_{6-x}$(C$_n$F$_{2n+1}$)$_x$ (1<x<6, n=1 or 2), NaSCN, NaBr, NaI, Na$_2$SO$_4$, Na$_2$B$_{10}$Cl$_{10}$, NaClO$_4$, NaI, NaSCN, NaBr, NaPF$_4$(C$_2$O$_4$), NaBF$_4$, NaPF$_6$, or the like or (d) an organic ion salt including sodium such as NaCF$_3$SO$_3$, NaN(CF$_3$SO$_2$)$_2$, NaN(C$_2$F$_5$SO$_2$)$_2$, NaN(CF$_3$SO$_2$)(C$_4$F$_9$SO$_2$), NaC(CF$_3$SO$_2$)$_3$, NaC(C$_2$F$_5$SO$_2$)$_3$ or (e) an organic salt such as (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n-C$_4$H$_9$)$_4$NClO$_4$, (n-C$_4$H$_9$)$_4$NI, (C$_2$H$_5$)$_4$N-maleate, (C$_2$H$_5$)$_4$N-benzoate, (C$_2$H$_5$)$_4$N-phthalate, sodium stearyl sulfonate, sodium octyl sulfonate, sodium dodecylbenzene sulfonate, or the like. The ionic compounds may be utilized singularly or in a mixture of two or more. Particular electrolyte salts that may be mentioned herein are LiClO$_4$, LiPF$_4$(C$_2$O$_4$), LiBF$_4$, LiPF$_6$ NaClO$_4$, NaPF$_4$, NaBF$_4$, and NaPF$_6$, which may be utilized singularly or in a mixture of two or more.

A concentration of the electrolyte salt is not particularly limited, and may be, for example, about 0.1 mol/L to about 10.0 mol/L.

The electrolyte may further include various suitable additives such as a negative electrode SEI (Solid Electrolyte Interface) forming agent, a surfactant, and/or the like. Such additives may be, for example, succinic anhydride, lithium bis(oxalato)borate, sodium bis(oxalato)borate, lithium tetrafluoroborate, sodium tetrafluoroborate a dinitrile compound, propane sultone, butane sultone, propene sultone, 3-sulfolene, a fluorinated allylether, a fluorinated acrylate, carbonates such as vinylene carbonate, vinyl ethylene carbonate and fluoroethylene carbonate and/or the like.

A solid electrolyte according to the invention can be prepared by mixing a first polymer and a dopant, and optionally a second polymer, a plasticizer and other components such as fillers, antioxidants, colouring agents, antifouling agents and dispersants, in a solvent such as N-methyl-2-pyrrolidinone (NMP), stirring for a period of time, typically 4-8 hours at elevated temperature, typically about 70° C.

When the solid electrolyte incorporates ceramic, the solid electrolyte can be prepared by mixing a first polymer, and a dopant, and optionally a second polymer, a plasticizer and other components such as fillers, antioxidants, colouring agents, antifouling agents and dispersants, in a solvent such as N-methyl-2-pyrrolidinone (NMP), stirring for a period of time, typically 4-8 hours at elevated temperature, typically about 70° C. After stirring for this period of time, ceramic is added and stirring is continued for a further period of time, typically 4-8 hours at elevated temperature, typically about 70° C.

Mixing takes place using standard mixing methods. For example, the polymer compositions can be formed using a Banbury mixer, a Brabender mixer and/or a twin screw mixer. Generally, twin screw mixers provide a higher shear during mixing, so polymer compositions formed using a twin screw extruder can exhibit better elongation and tensile properties.

After mixing is finished, in an embodiment, solid electrolyte is formed into a film, for example, to fulfil a role as an ionically conductive membrane divider in a battery. In an embodiment a slurry comprising the solid electrolyte is tape cast or hot pressed and cut into the appropriate size and shape for use in the respective energy storage system. In tape casting a slurry comprising the solid electrolyte is typically cast onto an aluminium foil and left to dry at elevated temperature, typically 80° C., for a period, typically overnight. Finally the aluminium foil substrate is peeled off. Alternatively a hot press can be used instead of the tape casting, which allows a reduction in the amount of plasticizer, if desired, to achieve a higher ceramic filler content and a higher mechanical strength.

The membrane divider is disposed between the anode and the cathode, forming an anode chamber and a cathode chamber. By way of example, in manufacturing a battery, the electrode structure is processed to have a desired shape, for example, a cylinder, a prism, a laminate shape, a button shape, and/or the like, and inserted into a container having the same shape. An ionically conductive membrane divider is inserted and secured in the container to form an anode chamber and a cathode chamber. Then, the non-aqueous electrolyte is injected into the anode chamber, and aqueous electrolyte is to the cathode chamber, thereby manufacturing a rechargeable lithium- or sodium-ion battery.

Hereinafter, embodiments of the invention are illustrated in more detail with reference to the following examples. However, the present disclosure is not limited thereto. Furthermore, what is not described in this disclosure may be sufficiently understood by those who have knowledge in this field and will not be illustrated herein.

EXAMPLES

General Method

Structural characterization of the samples was carried out using a high resolution X-ray powder diffractometer (Bruker D8) where Cu K$_\alpha$ radiation ($\lambda$=1.5406 Å) was employed and XRD patterns were collected in the 2θ range 10-100° with a nominal scan rate of 160 s/step and a step size of 0.02°. Generalized Structure Analysis System (A. C. Larson and R. B. Von Dreele, *Los Alamos National Laboratory Report* (*LAUR*), 2004, 86-748) along with the graphical user interface, EXPGUI, is applied to refine the X-ray patterns. Microscopic structure of samples was examined using scanning electron microscope (SEM, Zeiss Supra 40 VP). AC impedance measurements were performed using an impedance spectrometer (Solartron SI1260, Schlumberger) in the frequency range of 0.1 Hz to 10 MHz by the use of a Swagelok cell (X2 Labwares Pte Ltd). The cyclic performance studies of the Li-air cell were performed using potentiostat/galvanostat (Arbin BT2000 equipped with M/TS pro software).

Example 1. Preparation of LAGP Ceramic Pellets

Li$_{1+x}$Al$_x$Ge$_{2-x}$(PO$_4$)$_3$ (x=0.5) glass is prepared using a reported melt-quenching method (Safanama (2014)). Further annealing at 850° C. for 2 hours is carried out to ensure crystallisation. The annealing parameters are set to achieve high purity and ionic conductivity of the pellet based on the recent in situ synchrotron study of the LAGP phase formation process (Safanama (2016)).

Example 2. Characterisation of LAGP Ceramic Pellets by X-Ray Powder Diffraction

Figure 1:
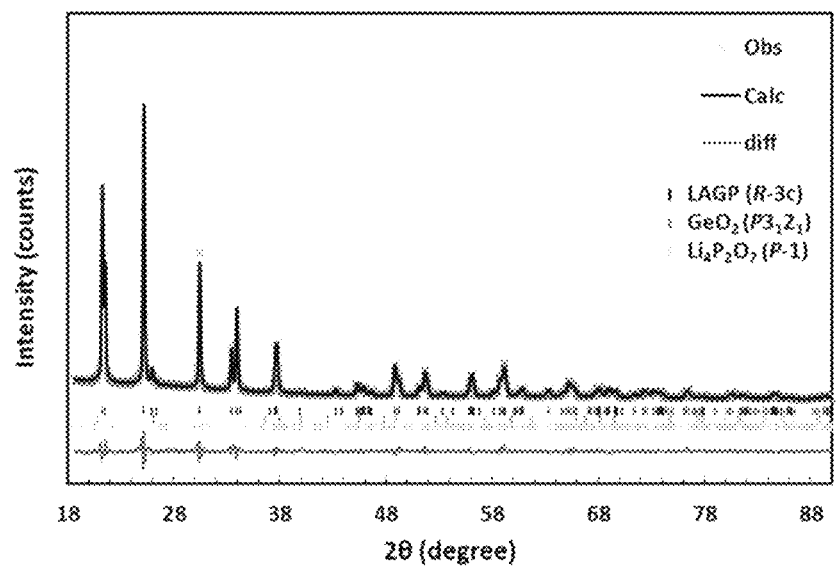
FIG. 1 shows (a) a Rietveld-refined XRD pattern for LAGP pellets annealed at 850° C. for 2 hours; (+) observed, (−) calculated and difference (wRp=6%); Vertical bars corresponding to the calculated Bragg reflections for LAGP (top), $GeO_2$ (middle) and $Li_4P_2O_4$ (bottom); and (b) a room temperature Nyquist plot of impedance for LAGP pellet.
Figure 1:
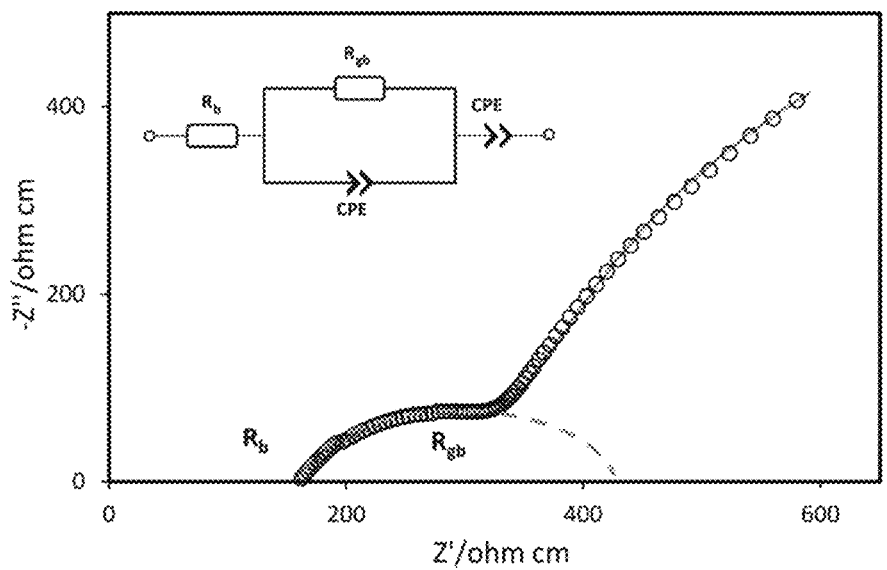

The Rietveld refinements (FIG. 1a) confirm the formation of NASICON-type LAGP as the dominant crystalline phase that adopts rhombohedral system (R-3c) and of the inevitable secondary phase of GeO$_2$ (space group P3$_1$2$_1$) with trace amounts of Li$_4$P$_2$O$_7$ (space group P-1). The lowest activation energy of E$_a$=0.35 eV is achieved for the sample annealed at 850° C. for 2 hours with the room temperature total conductivity as high as 4.0×10$^{-4}$ S cm$^{-1}$ (FIG. 1b). By annealing the sample at 850° C. the mass fraction of another common impurity phase, AlPO$_4$ (observed in Safanama (2014)), is diminished (Safanama (2016)). The refinement data also suggests that at 850° C., aluminium clearly prefers the Ge site and the AlLi¨ occupancy becomes hardly significant (for T=850° C.: 0.02 Al per formula unit on 6-fold Li(1) site). For lower annealing temperatures, there is roughly a random distribution of Al between the 6-fold Li(1) and the 12-fold Ge sites (e.g. per formula unit we find 0.07 Al on the Li(1) site, 0.08 Al on the Ge site in the sample annealed at 650° C.).

Example 3. Preparation of Polymer Membrane

Figure 2:
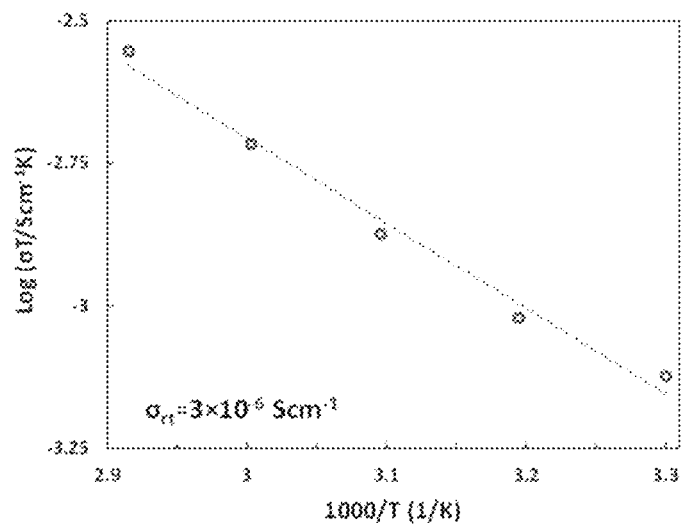
FIG. 2 is an Arrhenius plot of total conductivity of a polymer electrolyte in accordance with the present invention. Room temperature conductivity of the pure polymer phase is or $\sigma_{total}=3\times10^{-6}$ S cm$^{-1}$.

The polymer electrolyte was prepared by mixing the polyvinyl acetal resin, PvDF binder, plasticizer (benzyl butyl phthalate($C_{19}H_{20}O_4$)) and dopant salt (lithium tetrafluoroborate (LiBF$_4$)) in N-methyl-2-pyrrolidinone (NMP), stirring for 4 to 8 hours at elevated temperatures of about 70° C. After stirring was completed the polymer electrolyte was tape cast onto an aluminium foil and left to dry at 80° C. overnight. The room temperature conductivity of the pure polymer phase was $\sigma_{total}$=3×10$^{-6}$ Scm$^{-1}$. An Arrhenius plot of total conductivity of the polymer electrolyte is shown in FIG. 2.

The water resistance stability of the polymer component of the hybrid membrane was tested by making a DSC measurement. The result of DSC measurement (30° C. to 250° C.) on the hybrid membrane after it was immersed in deionized water for about a week is shown in FIG. 3. The only peaks that can be observed belong to the endothermic melting peaks of BUTVAR B98 (Eastman Chemical Company) and PVdF around 60° C. and 150° C., respectively. No sign of water absorption in the membrane is observed Example 4. Preparation of LAGP Ceramic-Organic Polymer Membrane The LAGP ceramic-organic polymer membrane consists of NASICON-type LAGP, from example 1, as the fast-ion conducting ceramic filler within a polymer blend consisting of a plasticizer benzyl butyl phthalate ($C_{19}H_{20}O_4$), a polyvinyl butyral resin (($C_8H_{14}O_2)_n$), lithium tetrafluoroborate (LiBF$_4$) as the dopant salt and polyvinylidene fluoride binder (PVdF). The LAGP ceramic is made by a reported method (Safanama (2014) and Safanama (2016)). BUTVAR B98 (Eastman Chemical Company) which is a type of polyvinyl butyral resin with excellent binding efficiency is reported to be stable in both acidic and basic solution. BUTVAR B98 typically has a molecular weight from 40,000 to 70,000, a hydroxyl content of 18.0-20.0%, an acetate content of 2.5% maximum and butyral content of approximately 80%. The stability of this resin has been tested in both weak and strong bases and acids via ASTM method of D543-56T to show its excellent resistance (Eastman Chemical Company, *Butvar, polyvinyl butyral resin: Properties and uses*; M. Bolgar, J. Hubball, J. Groeger and S. Meronek, *Handbook for the Chemical Analysis of Plastic and Polymer Additives*, CRC Press, 2007. Hence it was chosen as one of the main components in this method. Benzyl butyl phthalate ($C_{19}H_{20}O_4$) was employed as plasticizer in this method to improve the flexibility. N-methyl-2-pyrrolidinone (NMP) is used as the solvent.

In an embodiment of the membrane system, the weight percentages of the ingredients are as follows: 81 wt % LAGP, 3 wt % benzyl butyl phthalate, 4 wt % polyvinyl butyral resin, 4 wt % LiBF$_4$ and 8 wt % PVdF. The ideal amount of solvent NMP is 3.5 ml for 1 g of LAGP ceramic. The synthesis has been successfully scaled up to 5 g.

Preparation of the above-mentioned method involves mixing of the components in a glass beaker at 70° C. using a magnetic stirrer. After 6 hours of stirring, the mixture was cast onto an aluminium foil and left to dry at 80° C. overnight. This tape casting is easily scalable to large dimensions without compromising the homogeneity, thickness and performance of the membrane.

The mechanical properties and ionic conductivity of the membrane were optimised by varying the mass fraction of the ceramic and polymer constituents, thereby yielding the product with total conductivities of 1.0×10$^{-4}$ S cm$^{-1}$ (FIG. 4a). It may be noted that this value is nearly an order of magnitude lower than for the PEO-based hybrid membrane presented before (Safanama (2014)), the value of conductivity is still acceptable for application as anode-protecting membrane in Li-air batteries.

Example 5. Characterisation of LAGP Ceramic-Organic Polymer Membrane

The refined Rietveld pattern of the membrane, as shown in FIG. 4b, indicates LAGP (space group R-3c) as the dominant crystalline phase. The lattice parameters of the main crystalline phase of LAGP in the membrane are a=8.2614 (2) Å and c=20.636 (1) Å, respectively, only slightly lower than the value of c=20.6501 (1) Å for LAGP phase in the pellet form. This confirms that no phase transitions occur in the main crystalline phase due to the slurry preparation.

Example 6. Preparation of Garnet-Type Ceramic-Organic Polymer Membrane

A doped garnet-type oxide Li$_{7-x}$La$_3$Zr$_2$O$_{12}$, specifically Ta,Ga-codoped Li$_{6.75}$La$_3$Zr$_{1.75}$Ta$_{0.25}$O$_{12}$Ga$_{0.05}$,was used as ceramic filler in a polymer matrix comprising BUTVAR B98, PVdF, and benzyl butyl phthalate doped variously with LiBF$_4$, LiTFSi and LiCl. SOLSPERSE 20,000 was additionally used as a dispersant. The components were manually mixed and then pressed using a hot press to form a thin layer of membrane. The use of Ta,Ga-codoped Li$_{6.75}$La$_3$Zr$_{1.75}$Ta$_{0.25}$O$_{12}$Ga$_{0.05}$ in a hybrid membrane (noting that Ta,Ga-codoped Li$_{6.75}$La$_3$Zr$_{1.75}$Ta$_{0.25}$O$_{12}$Ga$_{0.05}$ has a conductivity of 7×10$^{-5}$ Scm$^{-1}$ alone), produces a membrane with an ionic conductivity in the order of 5.4×10$^{-5}$ Scm$^{-1}$ (FIG. 5). After comparing LiBF$_4$, LiTFSi and LiCl as doping salts, LiCl appeared most suitable for the case of the membrane with the garnet-type fillers.

Example 7. Stability of LAGP Ceramic-Organic Polymer Membrane in LiCl Solutions of Different pH As a measure of chemical stability, the hybrid membranes were immersed in different catholyte solutions of various pH values for different time durations. The effect of immersion time on the crystal structure, ionic conductivity and the surface topography of the hybrid membrane were examined.
Crystal Structure FIG. 6a compares the XRD patterns of hybrid membrane before and after immersion in slightly acidic LiCl solution (10 M; pH≈5-6). Interestingly, the XRD patterns are almost identical and no impurity peaks are formed for a long immersion time. This translates into excellent stability of the hybrid membrane in neutral LiCl solution (10 M). To investigate the slight changes in the phase fraction and lattice parameters of the main LAGP phase with immersion time more in detail, Rietveld refined patterns are compared and the results are summarized in Table 1. Accordingly, lattice parameters a and c are both almost constant for almost 6 months of immersion and the phase fraction of LAGP phase decreases only minutely. This shows that the membrane exhibits high chemical stability when in contact with LiCl (10 M) for up to 6 months.

Further investigation of the chemical stability was carried out in a more corrosive catholyte solution of strongly acidified LiCl (10 M) with pH value in the range of 2-3. The membrane is able to withstand the attack from the acid. The XRD patterns after immersion remained unchanged as shown on FIG. 6b. Accordingly, there is no sign of decomposition for this hybrid membrane in contact with this catholyte solution. As summarised in Table 1, the Rietveld refinement of the XRD data shows that immersion for 1 month, results in only a minute decrease of the phase fraction of LAGP phase from 97 to 94.4 accompanied by only a minor segregation of a secondary phase of $GeO_2$. The extraction of Ge from the main LAGP phase is evident from the constant increase in $GeO_2$ phase fraction. As expected, for the more severe acidic solution the changes in the lattice parameters a and c are slightly more significant. A sharp drop occurs for the lattice parameter c over the first 7 days of immersion and subsequent decrease rate with prolonged immersion is small.

TABLE 1

| | Phase Fractions | | Lattice Parameters/LAGP | |
|---|---|---|---|---|
| | LAGP | $GeO_2$ | a | c |
| Neutral LiCl (10M) | | | | |
| Before Immersion | 98 | 2 | 8.2614 (3) | 20.636 (1) |
| After 7 Days | 97 | 3 | 8.2613 (2) | 20.6393 (6) |
| After 14 Days | 97 | 3 | 8.2586 (2) | 20.6494 (5) |
| After 30 Days | 96.70 | 3.3 | 8.2600 (2) | 20.6491 (6) |
| After 6 months | 96.31 | 3.69 | 8.2603 (2) | 20.6417 (7) |
| Acidified LiCl (10M) | | | | |
| Before Immersion | 97.929 | 2.07 | 8.26119 (3) | 20.636 (1) |
| After 5 Days | 95.121 | 4.88 | 8.21935 | 20.5674 |
| After 12 Days | 95.117 | 4.88 | 8.21927 | 20.567081 |
| After 30 Days | 94.424 | 5.58 | 8.21662 | 20.561708 |

Ionic Conductivity

As shown in FIG. 7, for LiCl (10 M), the resistance decreased by immersion time resulting in enhanced conductivity. This decrease in the resistance could be attributed to the formation of new amorphous phase in the structure. Another possibility is the gradual increase in the salt doping of the polymer component with LiCl from the concentrated solution. The same trend was observed for LATP immersion in lithium chloride and was justified to the formation of $LiCl-xH_2O$ with lower resistance at the grain boundary (K. Takahashi (2012), M. Zhang (2012)).

Surface Topography

SEM images of the hybrid membrane before and after immersion are shown in FIG. 8. While the detailed morphology of the membrane gradually evolves over this long period, there are no signs of holes through the membrane formed on this extended exposure to the catholytes. The polymer layer formed on the surface of the membrane could be one of the factors contributing to the improved stability of the membrane by protecting the layers beneath.

Example 8. Cycling Performance of LAB, Containing LAGP Ceramic-Organic Polymer Membrane, in LiCl Solutions of Different pH This high stability of the proposed hybrid membrane directly translates into a higher performance energy storage system with longer cycle life when compared to systems using conventional composite membranes. As an example, FIGS. 9a and b represent the room temperature discharge/charge profiles of an aqueous Li-air cell using the hybrid membrane and LiCl (10 M) at pH value of 6.0 and acidified LiCl at pH value of 2 as the catholyte solutions, respectively. One drop of $LiPF_6$ in EC-DMC is used on the lithium anode to improve the contact. Reduction and evolution of oxygen is catalysed using CNT/Pt air-cathode. For both case, each cycles was limited to 1 hour, and current density was kept constant at 0.03 mA $cm^{-2}$ in the voltage range of 2 to 4.5 V. The charge and discharge capacities of the battery are intentionally limited in this test to 50 mAh/$g_c$. For the neutral LiCl (10 M), the battery worked with low overpotential for more than 80 cycles until the overpotential gradually increased (FIG. 9a). It should be noted that organic Li-air batteries typically have 10 times larger overpotentials (and hence lower power performance as well as lower energy efficiency).

The superior performance of the new hybrid membrane is demonstrated in a Li-air battery utilizing a highly acidified LiCl (10 M) with pH value of 2 (FIG. 9b). Under these acidic conditions, conventional PEO-based membranes decompose within a few hours. As can be seen in the Figure, this cell works with a low overpotential of <0.4 V for most of the cycles. The aqueous lithium air battery worked for over 140 cycles where each cycle was limited to 1 hour. The charge and discharge curves show flat plateaus for most of the cycles. The relatively low equilibrium voltage of the cell can be justified by assuming that the cell reaction is essentially following the 2-electron mechanism, during both charge and discharge. FIG. 9c compares the cell overpotentials for the hybrid membrane presented here with a PEO-based hybrid membrane in an aqueous Li-air cell. As can be seen here, due to the higher conductivity of the PEO-based membrane ($8×10^{-4}$ S $cm^{-1}$) it has smaller overpotentials initially when compared to hybrid membranes of the present invention. However use of the hybrid membrane greatly increases the lifetime of the cell.

REFERENCES

References cited herein are listed on the following pages, and are incorporated herein by this reference.
1. D. Safanama, N. Sharma, R. P. Rae, H. E. A. Brand and S. Adams, Journal of Materials Chemistry A, 2016, 4, 7718-7726.
2. M. Armand and J. M. Treason, Nature, 2008, 451, 652. J. E. Weston and B. C. H. Steele, Solid State Ionics, 1982, 7, 75-79.
3. K. M. Abraham, V. R. Koch and T. J. Blakely, Journal of The Electrochemical Society, 2000, 147, 1251-1256.
4. Aetukuri, N. B.; Kitajima, S.; Jung, E.; Thompson, L. E.; Virwani, K.; Reich, M.-L.; Kunze, M.; Schneider, M.; Schmidbauer, W.; Wilcke, W. W.; et al. Flexible Ion-Conducting Composite Membranes for Lithium Batteries. Adv. Energy Mater. 2015, 5 (14), 1500265.
5. X.-W. Zhang, C. Wang, A. J. Appleby and F. E. Little, Journal of Power Sources, 2002, 112, 209-215.

6. P. Zhang, H. Wang, Y.-G. Lee, M. Matsui, Y. Takeda, O. Yamamoto and N. Imanishi, Journal of The Electrochemical Society, 2015, 162, A1265-A1271.
7. D. Safanama, D. Damiano, R. P. Rao and S. Adams, Solid State Ionics, 2014, 262, 211-215.
8. Eastman Chemical Company, Butvar, polyvinyl butyral resin: Properties and uses. M. Bolgar, J. Hubball, J. Groeger and S. Meronek, Handbook for the Chemical Analysis of Plastic and Polymer Additives, CRC Press, 200.
9. K. Takahashi, et al., Journal of Electrochemical Society, 2012, 159, A342-A348.
10. M. Zhang, et al., Journal of The Electrochemical Society, 2012, 159, A1114-A1119.

The invention claimed is:

1. An electrolyte comprising:
   a first polymer selected from one or more of the group consisting of a polyvinyl acetal, polyvinyl acetate, and a copolymer comprising vinyl acetal and/or vinyl acetate units;
   a dopant comprising a lithium salt or a sodium salt; and
   a lithium ion-conducting ceramic or a sodium ion-comprising ceramic, wherein the electrolyte is a solid electrolyte.

2. The electrolyte as claimed in claim 1 wherein the polyvinyl acetal comprises units with the formula (I):

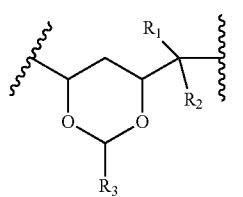

wherein $R_1$ and $R_2$ are independently selected from hydrogen, alkyl or alkyl substituted with hydroxyl, thiol, amino, halo, nitro, alkoxy, thioalkyl, alkylamino, dialkylamino, carboxy, alkoxycarbonyl, carbamoyl, thiocarbamoyl, alkylcarbamoyl, alkylthiocarbamoyl, dialkylcarbamoyl or dialkylthiocarbamoyl; and $R_3$ is selected from hydrogen, alkyl or alkyl substituted with hydroxyl, thiol, amino, halo, nitro, alkoxy, thioalkyl, alkylamino, dialkylamino, carboxy, alkoxycarbonyl, carbamoyl, thiocarbamoyl, alkylcarbamoyl, alkylthiocarbamoyl, dialkylcarbamoyl or dialkylthiocarbamoyl.

3. The solid electrolyte as claimed in claim 1 wherein the first polymer is a copolymer comprising vinyl acetal units and units selected from one or more of the group consisting of vinyl acetate units, vinyl alcohol units, (meth)acrylic acid units and methyl (meth)acrylate units.

4. The solid electrolyte as claimed in claim 3 wherein the first polymer is a copolymer consisting of vinyl acetal units, vinyl acetate units and vinyl alcohol units.

5. The electrolyte as claimed in claim 1 wherein the first polymer is polyvinyl butyral.

6. The electrolyte as claimed in claim 1 wherein the solid electrolyte further comprises a second polymer selected from one or more of the group consisting of polyvinylidene difluoride (PVdF), polyvinyl alcohol, a polyolefin-based resin, poly(propylene carbonate) a polyester-based resin, tetrafluoroethylene, a vinylidene difluoride-hexafluoropropylene copolymer, a vinylidene difluoride-perfluorovinylether copolymer, a vinylidene difluoride-tetrafluoroethylene copolymer, a vinylidene difluoride-trifluoroethylene copolymer, a vinylidene difluoride-fluoroethylene copolymer, a vinylidene difluoride-hexafluoroacetone copolymer, a vinylidene difluoride-ethylene copolymer, a vinylidene difluoride-propylene copolymer, a vinylidene difluoride-trifluoropropylene copolymer, a vinylidene difluoride-tetrafluoroethylene-hexafluoropropylene copolymer and a vinylidene difluoride-ethylene-tetrafluoroethylene copolymer.

7. The electrolyte as claimed in claim 1 further comprising a plasticizer selected from one or more of the group consisting of phthalate esters, phosphate ester plasticizers, phosphoric esters, fatty acid esters, esters of azelaic acid, esters of sebacic acid, trimellitic esters and polymeric plasticizers.

8. The electrolyte as claimed in claim 1 wherein the dopant is a lithium salt selected from one or more of the group consisting of lithium perchlorate ($LiClO_4$), lithium tetrafluoroborate ($LiBF_4$), lithium hexafluorophosphate ($LiPF_6$), lithium bis(trifluoromethanesulfonyl)imide, lithium bis(trifluoromethane)sulfonimide ($Li[N(CF_3SO_2)_2]$), lithium hexafluoroarsenate(V) ($LiAsF_6$), lithium bis(oxalatoborate), lithium nitrate ($LiNO_3$), lithium chloride ($LiCl$) and lithium bromide ($LiBr$).

9. The electrolyte as claimed in claim 1 wherein the dopant is a sodium salt selected from one or more of the group consisting of sodium nitrate ($NaNO_3$), sodium perchlorate ($NaClO_4$), sodium tetrafluoroborate ($NaBF_4$), sodium hexafluorophosphate ($NaPF_6$), sodium bis(trifluoromethanesulfonyl)imide, sodium bis(trifluoromethane)sulfonimide ($Na[N(CF_3SO_2)_2]$) $Na[N(CF_3SO_2)_2]$, sodium hexafluoroarsenate(V) ($NaAsF_6$) sodium bis(oxalatoborate), sodium halides, sodium thiocyanate ($NaSCN$), sodium pentacyanopropenide, sodium tetracyanopirolate and sodium tricyanoimidazolate.

10. The electrolyte as claimed in claim 1, wherein the lithium ion-conducting ceramic is selected from one or more of the group consisting of NASICON-type ceramics, lithium-stuffed garnet-type oxides, LISICON-type ceramics, Perovskite-type oxides, solid solutions in the $Li_3PO_4$-$Li_4SiO_4$ pseudobinary system $Li_{3+x}(P_{1-x}Si_x)O_4$ and lithium-ion conducting oxyhalide glasses.

11. The electrolyte as claimed in claim 1, wherein the sodium ion-conducting ceramic oxide is selected from one or more of the group consisting of NaSICON-structured oxides, beta-alumina and beta"-alumina phases $Na_2O.nAl_2O_3$ where $5 \leq n \leq 11$, sodium rare earth silicates, and sodium ion conducting oxyhalide glasses.

12. The electrolyte as claimed in claim 1 wherein the first polymer is present in an amount of from 15 to 30 wt % and the lithium or sodium salt is present in an amount of from 15 to 30 wt %, and optionally further comprising a second polymer present in an amount of from 30 to 50 wt and/or a plasticizer present in an amount of from 10 to 25 wt %.

13. The electrolyte as claimed in claim 12 wherein the solid electrolyte comprises from 10 to 25 wt % plasticizer, from 15 to 30 wt % polyvinyl acetal, from 15 to 30 wt % lithium or sodium salt and from 30 to 50 wt % PvDF.

14. The electrolyte as claimed in claim 1, wherein a ceramic is present at a level of from 60 wt % to 90 wt %.

15. The electrolyte as claimed in claim 14 which comprises from 60 to 90 wt % fast lithium ion conducting ceramic, from 1 to 5 wt % plasticizer, from 2 to 8 wt % polyvinyl acetal, from 2 to 8 wt % lithium salt and from 4 to 15 wt % PvDF.

16. The electrolyte as claimed in claim 14 which comprises from 60 to 90 wt % garnet-related Ta,Ga-codoped lithium lanthanum zirconate, from 2 to 8 wt % plasticizer, from 2 to 8 wt % polyvinyl acetal, from 2 to 8 wt % lithium salt and from 4 to 15 wt % PVdF.

17. An ionically conductive membrane divider for use in a battery comprising the electrolyte as claimed in claim 1.

18. A battery comprising an anode, a cathode, a catholyte and, optionally, an anolyte, in which an ionically conductive membrane divider as claimed in claim 17 separates the catholyte from the anode.

* * * * *